United States Patent
Lee et al.

(10) Patent No.: US 12,325,631 B2
(45) Date of Patent: Jun. 10, 2025

(54) SOLID ION CONDUCTOR, SOLID ELECTROLYTE INCLUDING THE SOLID ION CONDUCTOR, ELECTROCHEMICAL CELL INCLUDING THE SOLID ION CONDUCTOR, AND PREPARATION METHOD OF THE SAME

(71) Applicant: Samsung SDI Co., Ltd., Yongin-si (KR)

(72) Inventors: Seoksoo Lee, Yongin-si (KR); Soyeon Kim, Suwon-si (KR); Hyunseok Kim, Suwon-si (KR)

(73) Assignee: SAMSUNG SDI CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/330,949

(22) Filed: Jun. 7, 2023

(65) Prior Publication Data
US 2023/0331554 A1    Oct. 19, 2023

Related U.S. Application Data

(63) Continuation of application No. 17/027,799, filed on Sep. 22, 2020, now Pat. No. 11,702,337.

(30) Foreign Application Priority Data

Sep. 27, 2019 (KR) .................. 10-2019-0119828
Sep. 8, 2020  (KR) .................. 10-2020-0114856

(51) Int. Cl.
*C01B 25/14*    (2006.01)
*H01M 4/04*    (2006.01)
(Continued)

(52) U.S. Cl.
CPC .......... *C01B 25/14* (2013.01); *H01M 4/0471* (2013.01); *H01M 4/134* (2013.01); *H01M 4/405* (2013.01);
(Continued)

(58) Field of Classification Search
CPC ....... C01B 25/14; C01B 25/08; C01B 25/088; H01M 4/0471; H01M 4/134; H01M 4/405;
(Continued)

(56) References Cited

U.S. PATENT DOCUMENTS 6,402,795 B1  6/2002  Chu et al.
7,993,782 B2  8/2011  Takada et al.
(Continued)

FOREIGN PATENT DOCUMENTS

CN  109417194 A  3/2019
CN  110785885 A  2/2020
(Continued)

OTHER PUBLICATIONS

Chen et al., The unusual role of Li6PS5Br in all-solid-state CuS/Li6PS5Br/In—Li batteries, 2014, Solid State Ionics, 268, 300-304 (Year: 2014).*

(Continued)

*Primary Examiner* — Daniel S Gatewood
(74) *Attorney, Agent, or Firm* — CANTOR COLBURN LLP

(57) ABSTRACT

A compound represented by the Formula 1 and having an argyrodite-type crystal structure:

$$Li_aM1_xM2_wPS_yM3_z \qquad \text{Formula 1}$$

wherein M1 is at least one element of Group 2 or Group 11 of the periodic table, M2 is at least one metal element other than Li of Group 1 of the periodic table, M3 is at least one element of Group 17 of the periodic table, and wherein $4 \leq a \leq 8$, $0 < x < 0.5$, $0 \leq w < 0.5$, $3 \leq y \leq 7$, and $0 \leq z \leq 2$.

17 Claims, 6 Drawing Sheets

(51) Int. Cl.
  *H01M 4/134* (2010.01)
  *H01M 4/40* (2006.01)
  *H01M 10/0562* (2010.01)
(52) U.S. Cl.
  CPC ..... *H01M 10/0562* (2013.01); *C01P 2002/30* (2013.01); *C01P 2006/40* (2013.01); *H01M 2300/0068* (2013.01)
(58) Field of Classification Search
  CPC ..... H01M 10/0562; H01M 2300/0068; H01M 4/382; H01M 4/625; H01M 4/626; H01M 10/0525; H01M 10/052; C01P 2002/30; C01P 2006/40; Y02E 60/10; Y02P 70/50; C30B 29/46; C01G 3/006
  See application file for complete search history.

(56) References Cited

U.S. PATENT DOCUMENTS

| | | | |
|---|---|---|---|
| 8,075,865 | B2 | 12/2011 | Deiseroth et al. |
| 9,634,358 | B2 | 4/2017 | Matsushita |
| 9,793,574 | B2 | 10/2017 | Seino et al. |
| 9,812,734 | B2 | 11/2017 | Miyashita et al. |
| 9,899,701 | B2 | 2/2018 | Miyashita et al. |
| 9,899,702 | B2 | 2/2018 | Miyashita et al. |
| 10,879,562 | B2 | 12/2020 | Kim et al. |
| 11,699,809 | B2 | 7/2023 | Uesugi et al. |
| 2012/0135278 | A1 | 5/2012 | Yoshie et al. |
| 2013/0040208 | A1 | 2/2013 | Kanno et al. |
| 2014/0302382 | A1* | 10/2014 | Kambara .......... H01M 10/0562 429/321 |
| 2015/0333368 | A1 | 11/2015 | Kato et al. |
| 2016/0156064 | A1 | 6/2016 | Miyashita et al. |
| 2016/0240886 | A1 | 8/2016 | Yamasaki et al. |
| 2016/0293946 | A1 | 10/2016 | Ritter et al. |
| 2017/0187066 | A1 | 6/2017 | Tsujimura et al. |
| 2018/0351148 | A1* | 12/2018 | Schneider ............. H01M 4/382 |
| 2020/0358132 | A1 | 11/2020 | Yamada |
| 2020/0381772 | A1 | 12/2020 | Kim et al. |
| 2021/0135280 | A1 | 5/2021 | Lee et al. |

FOREIGN PATENT DOCUMENTS

| | | |
|---|---|---|
| EP | 3407412 A1 | 5/2018 |
| JP | 201144249 A | 3/2011 |
| JP | 201572783 A | 4/2015 |
| JP | 5985120 B1 | 8/2016 |
| JP | 6044587 B2 | 11/2016 |
| JP | 2020119782 A | 8/2020 |
| KR | 1020140096273 A | 8/2014 |
| KR | 101705267 B1 | 2/2017 |
| KR | 1020170077014 A | 7/2017 |
| KR | 101952196 A | 2/2019 |
| KR | 1020200000849 A | 1/2020 |
| WO | 2015011937 A1 | 1/2015 |
| WO | 2018218057 A2 | 11/2018 |
| WO | 2019009228 A1 | 1/2019 |
| WO | 2019098245 A1 | 5/2019 |
| WO | 2019107879 A1 | 6/2019 |

OTHER PUBLICATIONS

Office Action issued date Nov. 22, 2023 of EP Patent Application No. 20197830.1.
Office Action issued date Oct. 8, 2023 of CN Patent Application No. 202011030703.0.
Third Party Observation, JP Patent Application No. 2020-160907 dated Mar. 11, 2024 with English Translation.
Kinose, Yutaka et al., "Development of Lithium Sulfide for Solid Electrolyte", Creative No. 8, 2007.
Boulineau et al., "Mechanochemical synthesis of Li-argyrodite Li6PS5X (X=Cl, Br, I) as sulfur-based solid electrolytes for all solid state batteries application", Solid State Ionics, 221, 2012, 1-5.
Chen et al, "Stability and ionic mobility in argyrodite-related lithium-ion solid electrolytes", Phys. Chem. Chem.Phys., 2015, 17, 16494.
Chen et al., "Hight capacity all-solid-state Cu—Li2S/Li6PS5Br/In batteries", Solid State Ionics, 262, 2014, 183-187.
Chen et al., "The unusual role of Li6PS5Br in all-solid-state CuS/Li6PS5Br/In—Li batteries", Solid State Ionics, 268, 2014, 300-304.
Yersak et al., "Derivation of an Iron Pyrite All-Solid-State Composite Electrode with Ferrophosphorus, Sulfur, and Lithium Sulfide as Precursors", Journal of The Electrochemical Society, 161(5),2014, A663-A667.
Office Action dated Sep. 6, 2023, issued in corresponding EP Patent Application No. 20197830.1, 5 pp.

* cited by examiner

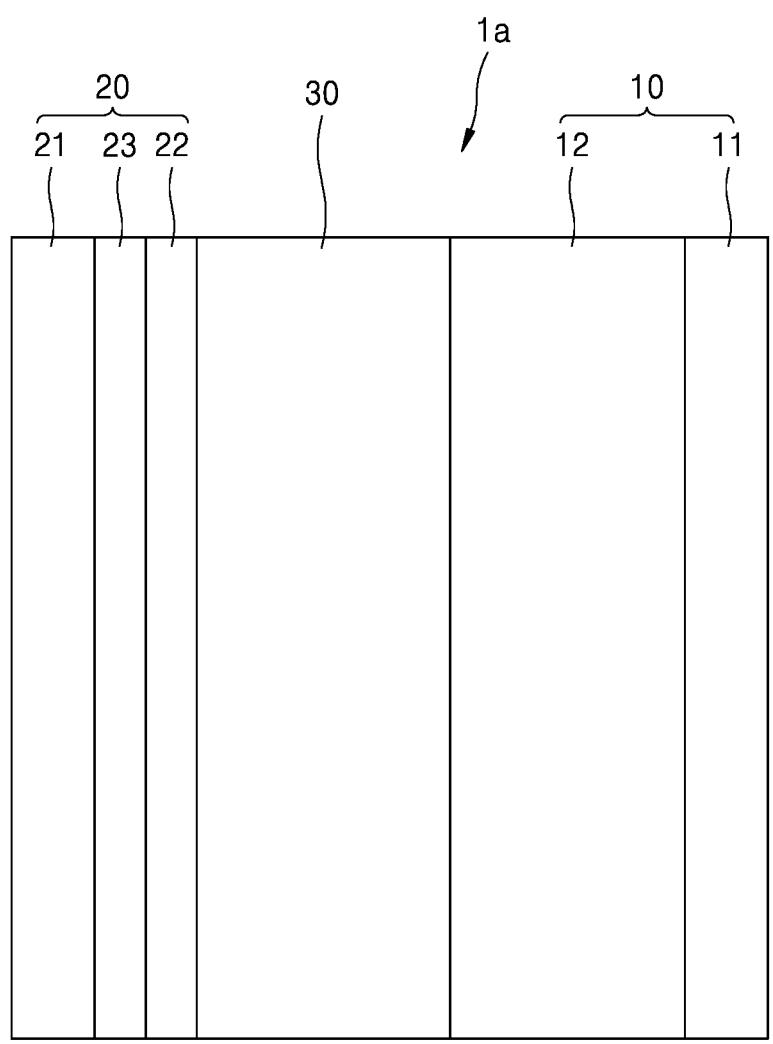

SOLID ION CONDUCTOR, SOLID ELECTROLYTE INCLUDING THE SOLID ION CONDUCTOR, ELECTROCHEMICAL CELL INCLUDING THE SOLID ION CONDUCTOR, AND PREPARATION METHOD OF THE SAME

CROSS-REFERENCE TO RELATED APPLICATION

This application is a continuation of U.S. application Ser. No. 17/027,799, filed on Sep. 22, 2020 and issued as U.S. Pat. No. 11,702,337, and claims priority to and the benefit of Korean Patent Application No. 10-2019-0119828, filed on Sep. 27, 2019, in the Korean Intellectual Property Office, and Korean Patent Application No. 10-2020-0114856, filed on Sep. 8, 2020, in the Korean Intellectual Property Office, and all the benefits accruing therefrom under 35 U.S.C. § 119, the contents of each which is incorporated herein by reference in their entirety.

BACKGROUND

1. Field

The present disclosure relates to a solid ion conductor, a solid electrolyte including the solid ion conductor, a lithium battery including the solid ion conductor, and a method of manufacturing the solid ion conductor.

2. Description of Related Art

An all-solid lithium battery contains a solid electrolyte. The all-solid lithium battery does not contain a combustible organic solvent, and thus has excellent stability.

Available solid electrolyte materials are not stable enough against lithium metal. In addition, the lithium ion conductivity of available solid electrolytes is less than that of liquid alternatives. Thus, there remains a need for an improved solid electrolyte material.

SUMMARY

An aspect provides a solid ion conductor having an improved conductivity to lithium ions and stability to lithium metal.

Another aspect is to provide a solid electrolyte including the solid ion conductor.

Another aspect is to provide an electrochemical cell including the solid ion conductor.

Another aspect is to provide a method for producing the solid ion conductor.

Additional aspects will be set forth in part in the description which follows and, in part, will be apparent from the description.

An aspect provides a compound represented by the Formula 1 and having an argyrodite-type crystal structure:

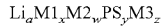    Formula 1 wherein,
  M1 is at least one element of Group 2 or Group 11 of the periodic table,
  M2 is at least one metal element other than Li of Group 1 of the periodic table,
  M3 is at least one element of Group 17 of the periodic table, and wherein $4 \leq a \leq 8$, $0 < x < 0.5$, $0 \leq w < 0.5$, $3 \leq y \leq 7$, and $0 \leq z \leq 2$.

Another aspect provides a solid electrolyte including the compound as described above.

According to another embodiment, provided is an electrochemical cell including: a cathode layer having a cathode active material layer, an anode layer having an anode active material layer, and an electrolyte layer arranged between the cathode layer and the anode layer, wherein at least one of the cathode active material layer and the electrolyte layer includes the compound as described above.

Another aspect provides a method of producing a solid ion conductor, the method including: contacting a compound is including lithium, a compound containing an element of Group 2 or Group 11 of the periodic table, a compound containing phosphorous (P), and a compound containing an element of Group 17 of the periodic table to provide a mixture; and heat treating the mixture in an inert atmosphere to prepare the solid ion conductor, wherein the solid ion conductor comprises the compound as described above.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a schematic diagram of another embodiment of an all-solid secondary battery.

DETAILED DESCRIPTION

Figure 1:
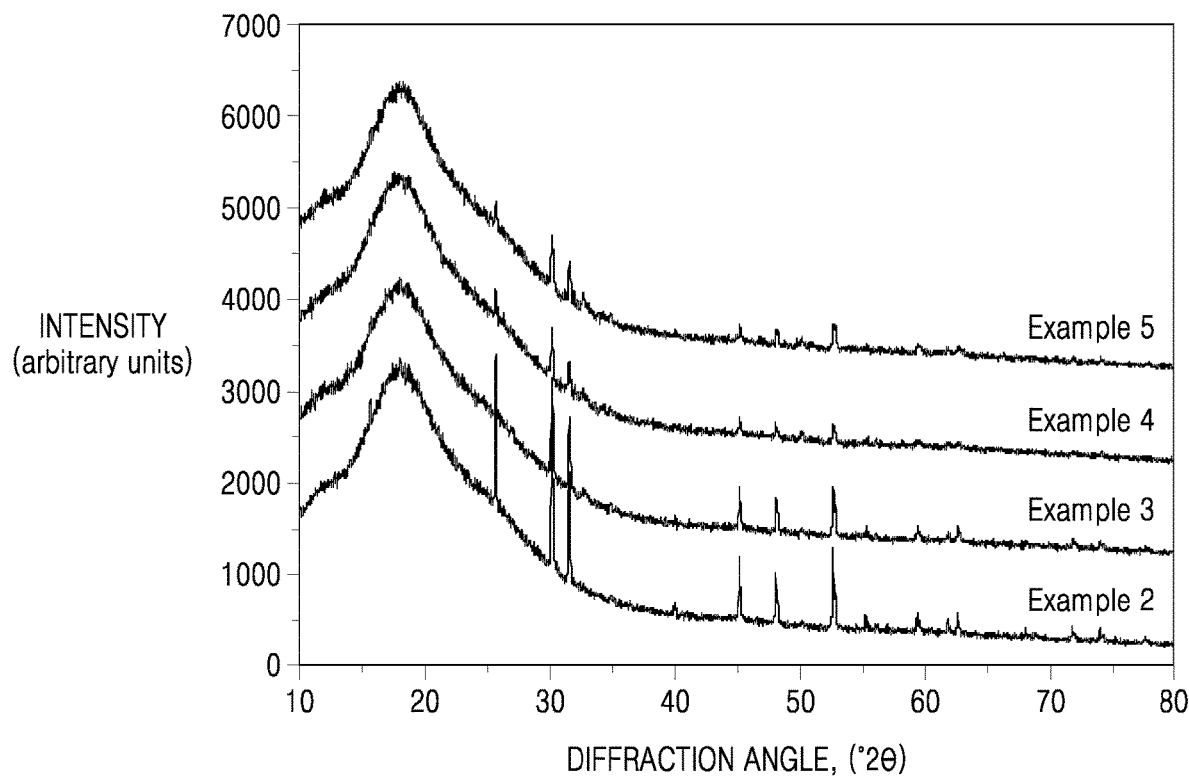
FIG. 1 is a graph of intensity (arbitrary units, a.u.) versus diffraction angel (° 2θ) and shows the results of powder X-ray diffraction analysis of solid ion conductor compounds prepared in Examples 2 to 5.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

When a component is referred to as being "on" another component, it will be understood that it may be directly on another component or other components may be interposed therebetween. In contrast, when a component is referred to as being "directly on" another component, there is no intervening component in between.

The terms "first," "second," "third," etc. may be used herein to describe various elements, components, regions, layers, and/or zones, but these elements, components, regions, layers and/or zones should not be limited by these terms. These terms are only used to distinguish one element, component, region, layer or zone from another element, component, region, layer or zone. Thus, a first element, component, region, layer or zone described below may be referred to as a second element, component, region, layer or zone without departing from the teachings herein.

The terminology used herein is for the purpose of describing particular embodiments only and is not intended to be limiting of the inventive concepts. As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. As used herein, the term "and/or" includes any and all combinations of one or more of the list items. As used in the description, the terms "comprises" and/or "comprising" specify the presence of specified features, regions, integers, steps, actions, elements, and/or components, and include one or more other features, regions, integers. It does not exclude the presence or addition of one or more other features, regions, integers, steps, actions, elements, components and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Spatially relative terms, such as "bottom," "below," "under," "top," "over," "above," and the like, may be used herein to easily describe a relationship of one component or feature to another component or feature. It will be understood that the spatially relative terms are intended to include different positions of the device in use or operation in addition to the positions shown in the figures. For example, if the apparatus of the figure is turned upside down, components described as "below" or "under" of other components or features will be oriented "above" of the other components or features. Thus, the exemplary term "below" may encompass both up and down positions. The device may be arranged in different directions (rotated 90 degrees or in other directions), and the spatially relative terms used herein may be interpreted accordingly.

Unless defined otherwise, all terms used herein, including technical and scientific terms, have the same meaning as commonly understood by one of ordinary skill in the art to which this disclosure belongs. In addition, it is also to be understood that the term as defined in the commonly used dictionaries should be interpreted to have a meaning consistent with the meaning in the context of the related art and the disclosure, and should not be construed as an idealized or overly formal meaning.

Exemplary embodiments are described herein with reference to cross-sectional views that are schematic diagrams of idealized embodiments. As such, deformations from the shapes of the illustrations should be expected as a result, for example, of errors in manufacturing techniques and/or tolerances. Thus, the embodiments described herein should not be construed as limited to the specific shapes of the regions as shown herein, but should include, for example, variations in shapes resulting from deviations in manufacture. For example, regions shown or described as flat may typically have rough and/or nonlinear features. More specifically, the sharply shown angle may be rounded. Thus, the regions shown in the figures are schematic in nature, the shapes of which are not intended to show the exact shape of the regions and are not intended to limit the scope of the claims.

"Group" means a group of Periodic Tables of Elements according to the International Pure and Applied Chemical Federation ("IUPAC") Group 1-18 Group Classification System.

Although particular embodiments have been described, alternatives, modifications, variations, improvements, and substantial equivalents that are presently unexpected or may be expected to occur may occur to the applicant or person skilled in the art. Accordingly, the appended claims, which may be filed and modified, are intended to include all such alternatives, modifications, variations, improvements and substantial equivalents.

"Argyrodite" or "argyrodite structure" as used herein means that the compound has a crystal structure isostructural with argyrodite, $Ag_8GeS_6$.

Hereinafter, a solid ion conductor compound, a solid electrolyte including the compound, an electrochemical cell including the compound, and a method of preparing the compound according to one or more exemplary embodiments will be described in more detail.

Solid Ion Conductor

A solid ion conductor compound according to an embodiment is represented by Formula 1 and has an argyrodite-type crystal structure:

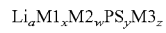

$$Li_aM1_xM2_wPS_yM3_z \hspace{2cm} \text{Formula 1}$$

wherein M1 is at least one element of Group 2 or Group 11 of the Periodic Table, M2 is at least one metal element other than Li of Group 1 of the Periodic Table, M3 is at least one element of Group 17 of the Periodic Table, and 4≤a≤8, 0<x<0.1, 0≤w<0.5, 3≤y≤7, and 0≤z≤2. For example, 0<x<0.9, 0<x<0.8, 0<x<0.7, 0<x<0.6 and 0<x<0.5. For example, 4≤a≤8, 0<x<0.5, 0≤w<0.5, 3≤y≤7, and 0≤z≤2. For example, 5≤a≤8, 0<x<0.5, 0≤w≤0.5, 4≤y≤7, and 0≤z≤2. For example, 5≤a≤7, 0<x<0.5, 0≤w≤0.5, 4≤y≤6, and 0≤z≤2. For example, 5.5≤a≤7, 0<x<0.5, 0≤w≤0.5, 4.5≤y≤6, and 0.2≤z≤1.8.

The compound represented by Formula 1 is, for example, a crystalline compound having a crystal structure, and includes a monovalent or divalent metal, e.g., M1 and/or M2, substituted in a region of the lithium site in the crystal structure, or in a lithium site, thereby improving the ionic conductivity of lithium ions within the compound and reducing the activation energy. For example, the solid ion conductor compound represented by Formula 1 includes lithium sites, wherein a crystal lattice volume may be increased by substituting another ion having the same oxidation number as lithium and a similar or larger ionic radius than a lithium ion in the region of the lithium site. Increasing the volume of the crystal lattice may facilitate the movement of lithium ions within the crystal lattice. For example, the lithium crystallographic site included in the solid ion conductor compound represented by Formula 1 may be a vacant site by substituting an ion having a greater oxidation number than a lithium ion, more specifically, such as an ion having an oxidation number of two or greater than two. The presence of the vacant site within the crystal lattice may facilitate the movement of lithium ions within the crystal lattice. M1 in Formula 1 may be a monovalent cation or a divalent cation.

M1 of the solid ion conductor compound represented by Formula 1, for example, may include at least one of Cu, Ag, or Mg.

M2 of the solid ion conductor compound represented by Formula 1, for example, may include at least one of Na or K.

M3 of the solid ion conductor compound represented by Formula 1, for example, may include at least one of F, Cl, Br, or I.

The solid ion conductor compound represented by Formula 1 may be, for example, a solid ion conductor compound represented by Formula 2:

$$Li_{7-x-z}M1_xPS_{6-z}M3_z \quad \text{Formula 2}$$

wherein M1 is at least one element of Group 2 or Group 11 of the periodic table, and M1 is a monovalent cation, M3 is at least one element of Group 17 of the periodic table, and M3 is an monovalent anion, and the conditions of $0<x<0.5$ and $0 \leq z \leq 2$ may be satisfied. In Formula 2, for example, the following conditions may be satisfied: $0<x<0.3$, $0<x<0.1$, $0<x<0.05$, $0<x<0.04$, or $0<x<0.03$.

A suitable monovalent cation may be at least one of Group 2 or Group 11 of the periodic table, and may be, for example, Cu, Ag, or Mg. A suitable monovalent anion is at least one of Group 17 of the periodic table and may be, for example, at least one of F, Cl, Br, or I. The combination of these may be, for example, at least one of a combination of Cl and Br, a combination of Cl and I, or a combination of Cl and F.

The solid ion conductor compound represented by Formula 1 may be, for example, a solid ion conductor compound represented by Formulas 2a:

$$Li_{7-x-z}M1_xPS_{6-z}Cl_z \quad \text{Formula 2a}$$

wherein M1 may be at least one of Cu, Ag, or Mg, and the conditions of $0<x<0.5$ and $1 \leq z \leq 2$ are satisfied. In Formula 2a, for example, the condition of $0<x<0.3$, $0<x<0.1$, $0<x<0.05$, $0<x<0.04$, or $0<x<0.03$ may be satisfied.

The solid ion conductor compound represented by Formula 1 may be, for example, a solid ion conductor compound represented by Formula 2b:

$$Li_{5.75-x}M1_xPS_{4.75}Cl_{1.25} \quad \text{Formula 2b}$$

wherein M1 may be at least one of Cu, Ag, or Mg, and the condition of $0<x<0.05$ may be satisfied. In Formula 2b, for example, the condition of $0<x<0.04$ or $0<x<0.03$ may be satisfied.

The solid ion conductor compound represented by Formula 1 may be, for example, a solid ion conductor compound represented by Formula 3:

$$(Li_{1-b}M1_b)_{7-z}PS_{6-z}M3_z \quad \text{Formula 3}$$

wherein M1 may be at least one element of Group 2 or Group 11 of the periodic table, and M1 is a monovalent cation, M3 may be at least one element of Group 17 of the periodic table, and M3 is a monovalent anion, and the conditions of $0<b \leq 0.06$ and $0 \leq z \leq 2$ are satisfied. In Formula 3, for example, the condition of $0<b \leq 0.05$, $0<b \leq 0.04$, $0<b \leq 0.03$, $0<b \leq 0.02$, $0<b \leq 0.01$, $0<b \leq 0.005$, or $0<b \leq 0.002$ may be satisfied.

The solid ion conductor compound represented by Formula 1 may be, for example, a solid ion conductor compound represented by one of Formula 3a to Formula 3c:

$$(Li_{1-b}Cu_b)_{7-z}PS_{6-z}M3_z \quad \text{Formula 3a}$$

$$(Li_{1-b}Ag_b)_{7-z}PS_{6-z}M3_z \quad \text{Formula 3b}$$

$$(Li_{1-b}Mg_b)_{7-z}PS_{6-z}M3_z \quad \text{Formula 3c}$$

In Formula 3a to Formula 3c, M3 may be at least one of F, Cl, Br, or I, and the conditions of $0<b \leq 0.06$ and $0 \leq z \leq 2$ may be satisfied. In Formula 3a to Formula 3c, for example, the condition of $0<b<0.05$ may be satisfied. In Formula 3a to Formula 3c, for example, the condition of $0<b \leq 0.04$, $0<b \leq 0.03$, $0<b \leq 0.02$, $0<b \leq 0.01$, $0<b \leq 0.005$, or $0<b \leq 0.002$ may be satisfied.

The solid ion conductor compound represented by Formula 1 may be represented by, for example, at least one of the formulas:

$(Li_{1-b}Cu_b)_{7-z}PS_{6-z}Cl_z$, $(Li_{1-b}Ag_b)_{7-z}PS_{6-z}Cl_z$, $(Li_{1-b}Mg_b)_{7-z}PS_{6-z}Cl_z$, $(Li_{1-b}Cu_b)_{7-z}PS_{6-z}Br_z$, $(Li_{1-b}Ag_b)_{7-z}PS_{6-z}Br_z$, $(Li_{1-b}Mg_b)_{7-z}PS_{6-z}Br_z$, $(Li_{1-b}Cu_b)_{7-z}PS_{6-z}I_z$, $(Li_{1-b}Ag_b)_{7-z}PS_{6-z}I_z$, or $(Li_{1-b}Mgb)_{7-z}PS_{6-z}I_z$, wherein b and z are each independently selected and the conditions of $0<b \leq 0.05$ and $0 \leq z \leq 2$ may be satisfied. In these formulas, for example, the condition of $0<b \leq 0.04$, $0<b \leq 0.03$, $0<b \leq 0.02$, $0<b \leq 0.01$, $0<b \leq 0.005$, or $0<b \leq 0.002$ may be satisfied.

The solid ion conductor compound represented by Formula 1 may be a solid ion conductor compound represented by, for example, at least one of the formulas:

$(Li_{5.74}Cu_{0.01})PS_{4.75}Cl_{1.25}$, $(Li_{5.73}Cu_{0.02})PS_{4.75}Cl_{1.25}$, $(Li_{5.72}Cu_{0.03})PS_{4.75}C_{1.25}$, $(Li_{5.71}Cu_{0.04})PS_{4.75}Cl_{1.25}$, $(Li_{5.70}Cu_{0.05})PS_{4.75}Cl_{1.25}$, $(Li_{5.69}Cu_{0.06})PS_{4.75}Cl_{1.25}$, $(Li_{5.66}Cu_{0.09})PS_{4.75}Cl_{1.25}$, $(Li_{5.63}Cu_{0.12})PS_{4.75}Cl_{1.25}$, $(Li_{5.60}Cu_{0.15})PS_{4.75}C_{1.25}$, $(Li_{5.57}Cu_{0.18})PS_{4.75}Cl_{1.25}$, $(Li_{5.54}Cu_{0.21})PS_{4.75}Cl_{1.25}$, $(Li_{5.45}Cu_{0.30})PS_{4.75}Cl_{1.25}$, $(Li_{5.74}Ag_{0.01})PS_{4.75}Cl_{1.25}$, $(Li_{5.73}Ag_{0.02})PS_{4.75}Cl_{1.25}$, $(Li_{5.72}Ag_{0.03})PS_{4.75}Cl_{1.25}$, $(Li_{5.71}Ag_{0.04})PS_{4.75}Cl_{1.25}$, $(Li_{5.70}Ag_{0.05})PS_{4.75}Cl_{1.25}$, $(Li_{5.69}Ag_{0.06})PS_{4.75}Cl_{1.25}$, $(Li5.66Ag0.09)PS_{4.75}Cl_{1.25}$, $(Li_{5.63}Ag_{0.12})PS_{4.75}Cl_{1.25}$, $(Li_{5.60}Ag_{0.15})PS_{4.75}Cl_{1.25}$, $(Li5.57Ag0.18)PS_{4.75}Cl_{1.25}$, $(Li_{5.54}Ag_{0.21})PS_{4.75}Cl_{1.25}$, $(Li_{5.45}Ag_{0.30})PS_{4.75}Cl_{1.25}$, $(Li_{5.74}Mg_{0.01})PS_{4.75}Cl_{1.25}$, $(Li_{5.73}Mg_{0.02})PS_{4.75}Cl_{1.25}$, $(Li_{5.72}Mg_{0.03})PS_{4.75}Cl_{1.25}$, $(Li_{5.71}Mg_{0.04})PS_{4.75}Cl_{1.25}$, $(Li_{5.70}Mg_{0.05})PS_{4.75}Cl_{1.25}$, $(Li_{5.69}Mg_{0.06})PS_{4.75}Cl_{1.25}$, $(Li_{5.66}Mg_{0.09})PS_{4.75}Cl_{1.25}$, $(Li5.63Mg0.12)PS_{4.75}Cl_{1.25}$, $(Li_{5.60}Mg_{0.15})PS_{4.75}Cl_{1.25}$, $(Li_{5.57}Mg_{0.18})PS_{4.75}Cl_{1.25}$, $(Li_{5.54}Mg_{0.21})PS_{4.75}Cl_{1.25}$, $(Li_{5.45}Mg_{0.30})PS_{4.75}Cl_{1.25}$, $(Li_{5.74}Cu_{0.01})PS_{4.75}Br_{1.25}$, $(Li_{5.73}Cu_{0.02})PS_{4.75}Br_{1.25}$, $(Li_{5.72}Cu_{0.03})PS_{4.75}Br_{1.25}$, $(Li_{5.71}Cu_{0.04})PS_{4.75}Br_{1.25}$, $(Li_{5.70}Cu_{0.05})PS_{4.75}Br_{1.25}$, $(Li_{5.69}Cu_{0.06})PS_{4.75}Br_{1.25}$, $(Li_{5.66}Cu_{0.09})PS_{4.75}Br_{1.25}$, $(Li_{5.63}Cu_{0.12})PS_{4.75}Br_{1.25}$, $(Li_{5.60}Cu_{0.15})PS_{4.75}Br_{1.25}$, $(Li_{5.57}Cu_{0.18})PS_{4.75}Br_{1.25}$, $(Li_{5.54}Cu_{0.21})PS_{4.75}Br_{1.25}$, $(Li_{5.45}Cu_{0.30})PS_{4.75}Br_{1.25}$, $(Li_{5.74}Ag_{0.01})PS_{4.75}Br_{1.25}$, $(Li_{5.73}Ag_{0.02})PS_{4.75}Br_{1.25}$, $(Li_{5.72}Ag_{0.03})PS_{4.75}Br_{1.25}$, $(Li_{5.71}Ag_{0.04})PS_{4.75}Br_{1.25}$, $(Li_{5.70}Ag_{0.05})PS_{4.75}Br_{1.25}$, $(Li_{5.69}Ag_{0.06})PS_{4.75}Br_{1.25}$, $(Li_{5.66}Ag_{0.09})PS_{4.75}Br_{1.25}$, $(Li_{5.63}Ag_{0.12})PS_{4.75}Br_{1.25}$, $(Li_{5.60}Ag_{0.15})PS_{4.75}Br_{1.25}$, $(Li_{5.57}Ag_{0.18})PS_{4.75}Br_{1.25}$, $(Li_{5.54}Ag_{0.21})PS_{4.75}Br_{1.25}$, $(Li_{5.45}Ag_{0.30})PS_{4.75}Br_{1.25}$, $(Li_{5.74}Mg_{0.01})PS_{4.75}Br_{1.25}$, $(Li_{5.73}Mg_{0.02})PS_{4.75}Br_{1.25}$, $(Li_{5.72}Mg_{0.03})PS_{4.75}Br_{1.25}$, $(Li_{5.71}Mg_{0.04})PS_{4.75}Br_{1.25}$, $(Li_{5.70}Mg_{0.05})PS_{4.75}Br_{1.25}$, $(Li_{5.69}Mg_{0.06})PS_{4.75}Br_{1.25}$, $(Li_{5.66}Mg_{0.09})PS_{4.75}Br_{1.25}$, $(Li_{5.63}Mg_{0.12})PS_{4.75}Br_{1.25}$, $(Li_{5.60}Mg_{0.15})PS_{4.75}Br_{1.25}$, $(Li_{5.57}Mg_{0.18})PS_{4.75}Br_{1.25}$, $(Li_{5.54}Mg_{0.21})PS_{4.75}Br_{1.25}$, $(Li_{5.45}Mg_{0.30})PS_{4.75}Br_{1.25}$, $(Li_{5.74}Cu_{0.01})PS_{4.75}I_{1.25}$, $(Li_{5.73}Cu_{0.02})PS_{4.75}I_{1.25}$, $(Li_{5.72}Cu_{0.03})PS_{4.75}I_{1.25}$, $(Li_{5.71}Cu_{0.04})PS_{4.75}I_{1.25}$, $(Li_{5.70}Cu_{0.05})PS_{4.75}I_{1.25}$, $(Li_{5.69}Cu_{0.06})PS_{4.75}I_{1.25}$, $(Li_{5.66}Cu_{0.09})PS_{4.75}I_{1.25}$, $(Li_{5.63}Cu_{0.12})PS_{4.75}I_{1.25}$, $(Li_{5.60}Cu_{0.15})PS_{4.75}I_{1.25}$, $(Li_{5.57}Cu_{0.18})PS_{4.75}I_{1.25}$, $(Li_{5.54}Cu_{0.21})PS_{4.75}I_{1.25}$, $(Li_{5.45}Cu_{0.30})PS_{4.75}I_{1.25}$, $(Li_{5.74}Ag_{0.01})PS_{4.75}I_{1.25}$, $(Li_{5.73}Ag_{0.02})PS_{4.75}I_{1.25}$, $(Li_{5.72}Ag_{0.03})PS_{4.75}I_{1.25}$, $(Li_{5.71}Ag_{0.04})PS_{4.75}I_{1.25}$, $(Li_{5.70}Ag_{0.05})PS_{4.75}I_{1.25}$, $(Li_{5.69}Ag_{0.06})PS_{4.75}I_{1.25}$, $(Li_{5.66}Ag_{0.09})PS_{4.75}I_{1.25}$, $(Li_{5.63}Ag_{0.12})PS_{4.75}I_{1.25}$, $(Li_{5.60}Ag_{0.15})PS_{4.75}I_{1.25}$, $(Li_{5.57}Ag_{0.18})PS_{4.75}I_{1.25}$, $(Li_{5.54}Ag_{0.21})PS_{4.75}I_{1.25}$, $(Li_{5.45}Ag_{0.30})PS_{4.75}I_{1.25}$, $(Li_{5.74}Mg_{0.01})PS_{4.75}I_{1.25}$, $(Li_{5.73}Mg_{0.02})PS_{4.75}I_{1.25}$, $(Li_{5.72}Mg_{0.03})PS_{4.75}I_{1.25}$, $(Li_{5.71}Mg_{0.04})PS_{4.75}I_{1.25}$, $(Li_{5.70}Mg_{0.05})PS_{4.75}I_{1.25}$, $(Li_{5.69}Mg_{0.06})PS_{4.75}I_{1.25}$, $(Li_{5.66}Mg_{0.09})PS_{4.75}I_{1.25}$, $(Li_{5.63}Mg_{0.12})PS_{4.75}I_{1.25}$, $(Li_{5.60}Mg_{0.15})PS_{4.75}I_{1.25}$, $(Li_{5.57}Mg_{0.18})PS_{4.75}I_{1.25}$, $(Li_{5.54}Mg_{0.21})PS_{4.75}I_{1.25}$, or $(Li_{5.45}Mg_{0.30})PS_{4.75}I_{1.25}$.

The solid ion conductor compound represented by Formula 1 may be, for example, a solid ion conductor compound represented by Formula 4:

$$Li_{7-x-w-z}M1_xM2_wPS_{6-z}M3_z, \quad \text{Formula 4}$$

wherein M1 may be at least one element of Group 2 or Group 11 of the periodic table, and M1 is a monovalent cation, M2 may be other than Li and at least one metal element of Group 1 of the periodic table, and M2 is a monovalent cation, M3 may be at least one element of Group 17 of the periodic table, and M3 is a monovalent anion, and the conditions of $0<x<0.5$, $0\leq w<0.5$, $0<x+w<0.5$, and $0\leq z\leq 2$ may be satisfied. In Formula 4, for example, the condition of $0<x+w<0.3$, $0<x+w<0.1$, $0<x+w<0.05$, $0<x+w<0.04$, or $0<x+w<0.03$ may be satisfied.

A suitable monovalent cation may be at least one element of Group 2 or Group 11 of the periodic table, and may be, for example, at least one of Cu, Ag, or Mg.

A suitable monovalent cation may be at least one element of Group 1 of the periodic table and may be, for example, Na or K.

The solid ion conductor compound represented by Formula 1 may be, for example, a solid ion conductor compound represented by Formula 4a:

$$Li_{7-x-w-z}M1_xM2_wPS_{6-z}Cl_z, \quad \text{Formula 4a}$$

wherein M1 may be at least one of Cu, Ag, or Mg, M2 may be at least one of Na or K, and the conditions of $0<x<0.5$, $0<w<0.5$, $0<x+w<0.5$, and $1\leq z\leq 2$ may be satisfied. In Formula 4a, for example, the condition of $0<x+w<0.3$, $0<x+w<0.1$, $0<x+w<0.05$, $0<x+w<0.04$, or $0<x+w<0.03$ may be satisfied.

The solid ion conductor compound represented by Formula 1 may be, for example, a solid ion conductor compound represented by Formula 4b:

$$Li_{5.75-x-w}M1_xM2_wPS_{4.75}Cl_{1.25} \quad \text{Formula 4b}$$

wherein M1 may be at least one of Cu, Ag, or Mg, M2 may be at least one of Na or K, and the conditions of $0<x<0.05$, $0<w<0.05$, and $0<x+w<0.05$ may be satisfied. In Formula 4b, for example, the condition of $0<x+w<0.3$, $0<x+w<0.1$, $0<x+w<0.05$, $0<x+w<0.04$, or $0<x+w<0.03$ may be satisfied.

The solid ion conductor compound represented by Formula 1 may be, for example, a solid ion conductor compound represented by Formula 5:

$$(Li_{1-b-c}M1_bM2_c)_{7-z}PS_{6-z}M3_z \quad \text{Formula 5}$$

wherein M1 may be at least one element of Group 2 or Group 11 of the periodic table, and M1 is a monovalent cation, M2 may be other than Li and at least one metal element of Group 1 of the periodic table, and M2 is a monovalent cation, M3 may be at least one element of Group 17 of the periodic table, and M3 is a monovalent anion, and the conditions of $0<b<0.1$, $0<c<0.1$, $0<b-Fc\leq 0.1$, and Oz2 may be satisfied. In Formula 5, for example, the conditions of $0<b<0.07$, $0<c<0.07$ and, for example, the condition of $0<b+c\leq 0.07$, $0<b+c\leq 0.06$, $0<b+c\leq 0.05$, $0<b+c\leq 0.04$, $0<b+c\leq 0.03$, $0<b+c\leq 0.02$, $0<b+c\leq 0.01$, $0<b+c\leq 0.005$, or $0<b+c\leq 0.002$ may be satisfied. In Formula 5, for example, the conditions of $0<b<0.05$ and $0<c<0.05$ may be satisfied, for example, the condition of $0<b+c\leq 0.05$, $0<b+c\leq 0.04$, $0<b+c\leq 0.03$, $0<b+c\leq 0.02$, $0<b+c\leq 0.01$, $0<b+c\leq 0.005$, or $0<b+c\leq 0.002$ may be satisfied.

The compound represented by Formula 1 may be, for example, a solid ion conductor compound represented by one of Formula 5a to Formula 5f:

$$(Li_{1-b-c}Cu_bNa_c)_{7-z}PS_{6-z}M3_z, \quad \text{Formula 5a}$$

$$(Li_{1-b-c}Ag_bNa_c)_{7-z}PS_{6-z}M3_z, \quad \text{Formula 5b}$$

$$(Li_{1-b-c}Mg_bNa_c)_{7-z}PS_{6-z}M3_z, \quad \text{Formula 5c}$$

$$(Li_{1-b-c}Cu_bK_c)_{7-z}PS_{6-z}M3_z, \quad \text{Formula 5d}$$

$$(Li_{1-b-c}Ag_bK_c)_{7-z}PS_{6-z}M3_z, \text{ or} \quad \text{Formula 5d}$$

$$(Li_{1-b-c}Mg_bK_c)_{7-z}PS_{6-z}M3_z, \quad \text{Formula 5d}$$

wherein M3 may be at least one of $F^-$, $Cl^-$, $Br^-$, or $I^-$, and the conditions of $0<b<0.1$, $0<b<0.1$, $0<b-Fc\leq 0.1$, and Oz2 may be satisfied. In Formula 5a to Formula 5f, for example, the conditions of $0<b<0.07$, $0<c<0.07$ and, for example, the condition of $0<b+c\leq 0.07$, $0<b+c\leq 0.06$, $0<b+c\leq 0.05$, $0<b+c\leq 0.04$, $0<b+c\leq 0.03$, $0<b+c\leq 0.02$, $0<b+c\leq 0.01$, $0<b+c\leq 0.005$, or $0<b+c\leq 0.002$ may be satisfied. In Formula 5a to Formula 5f, for example, the conditions of $0<b<0.05$ and $0<c<0.05$ may be satisfied, and, for example, the condition of $0<b+c\leq 0.05$, $0<b+c\leq 0.04$, $0<b+c\leq 0.03$, $0<b+c\leq 0.02$, $0<b+c\leq 0.01$, $0<b+c\leq 0.005$, or $0<b+c\leq 0.002$ may be satisfied.

The compound represented by Formula 1 may be, for example, a solid ion conductor compound represented by at least one of the formulas:

$(Li_{1-b-c}Cu_bNa_c)_{7-z}PS_{6-z}Cl_z$, $(Li_{1-b-c}Ag_bNa_c)_{7-z}PS_{6-z}Cl_z$, $(Li_{1-b-c}Mg_bNa_c)_{7-z}PS_{6-z}Cl_z$, $(Li_{1-b-c}Cu_bK_c)_{7-z}PS_{6-z}Cl_z$, $(Li_{1-b-c}Ag_bK_c)_{7-z}PS_{6-z}Cl_z$, $(Li_{1-b-c}Mg_bK_c)_{7-z}PS_{6-z}Cl_z$, $(Li_{1-b-c}Cu_bNa_c)_{7-z}PS_{6-z}Br_z$, $(Li_{1-b-c}Ag_bNa_c)_{7-z}PS_{6-z}Br_z$, $(Li_{1-b-c}Mg_bNa_c)_{7-z}PS_{6-z}Br_z$, $(Li_{1-b-c}Cu_bK_c)_{7-z}PS_{6-z}Br_z$, $(Li_{1-b-c}Ag_bK_c)_{7-z}PS_{6-z}Br_z$, $(Li_{1-b-c}Mg_bK_c)_{7-z}PS_{6-z}Br_z$, $(Li_{1-b-c}Cu_bNa_c)_{7-z}PS_{6-z}I_z$, $(Li_{1-b-c}Ag_bNa_c)_{7-z}PS_{6-z}I_z$, $(Li_{1-b-c}Mg_bNa_c)_{7-z}PS_{6-z}I_z$, $(Li_{1-b-c}Cu_bK_c)_{7-z}PS_{6-z}I_z$, $(Li_{1-b-c}Ag_bK_c)_{7-z}PS_{6-z}I_z$, or $(Li_{1-b-c}Mg_bK_c)_{7-z}PS_{6-z}I_z$, wherein b, c, and z are each independently selected, and the conditions of $0<b<0.05$, $0<c<0.05$, $0<b+c\leq 0.05$, and $0<z\leq 2$ may be satisfied. For example, the conditions of $0<b<0.04$ and $0<c<0.04$ may be satisfied, and for example, the condition of $0<b+c\leq 0.04$, $0<b+c\leq 0.03$, $0<b+c\leq 0.02$, $0<b+c\leq 0.01$, $0<b+c\leq 0.005$, or $0<b+c\leq 0.002$ may be satisfied.

The solid ion conductor compound represented by Formula 1 may be for example, a solid ion conductor compound represented by at least one of the formulas:

$(Li_{5.73}Cu_{0.01}Na_{0.01})PS_{4.75}Cl_{1.25}$, $(Li_{5.71}Cu_{0.02}Na_{0.02})PS_{4.75}Cl_{1.25}$, $(Li_{5.70}Cu_{0.03}Na_{0.02})PS_{4.75}Cl_{1.25}$, $(Li_{5.66}Cu_{0.06}Na_{0.03})PS_{4.75}Cl_{1.25}$, $(Li_{5.63}Cu_{0.06}Na_{0.06})PS_{4.75}Cl_{1.25}$, $(Li_{5.60}Cu_{0.06}Na_{0.09})PS_{4.75}Cl_{1.25}$, $(Li_{5.72}Cu_{0.02}Na_{0.01})PS_{4.75}Cl_{1.25}$, $(Li_{5.71}Cu_{0.03}Na_{0.01})PS_{4.75}Cl_{1.25}$, $(Li_{5.69}Cu_{0.03}Na_{0.03})PS_{4.75}Cl_{1.25}$, $(Li_{5.66}Cu_{0.03}Na_{0.06})PS_{4.75}Cl_{1.25}$, $(Li_{5.60}Cu_{0.09}Na_{0.06})PS_{4.75}Cl_{1.25}$, $(Li_{5.57}Cu_{0.9}Na_{0.09})PS_{4.75}Cl_{1.25}$, $(Li_{5.51}Cu_{0.12}Na_{0.12})PS_{4.75}Cl_{1.25}$, $(Li_{5.45}Cu_{0.15}Na_{0.15})PS_{4.75}Cl_{1.25}$, $(Li_{5.73}Ag_{0.01}Na_{0.01})PS_{4.75}Cl_{1.25}$, $(Li_{5.71}Ag_{0.02}Na_{0.02})PS_{4.75}Cl_{1.25}$, $(Li_{5.70}Ag_{0.03}Na_{0.02})PS_{4.75}Cl_{1.25}$, $(Li_{5.66}Ag_{0.06}Na_{0.03})PS_{4.75}Cl_{1.25}$, $(Li_{5.63}Ag_{0.06}Na_{0.06})PS_{4.75}Cl_{1.25}$, $(Li_{5.60}Ag_{0.06}Na_{0.09})PS_{4.75}Cl_{1.25}$, $(Li_{5.72}Ag_{0.02}Na_{0.01})PS_{4.75}Cl_{1.25}$, $(Li_{5.71}Ag_{0.03}Na_{0.01})PS_{4.75}Cl_{1.25}$, $(Li_{5.69}Ag_{0.03}Na_{0.03})PS_{4.75}Cl_{1.25}$, $(Li_{5.66}Ag_{0.03}Na_{0.06})PS_{4.75}Cl_{1.25}$, $(Li_{5.60}Ag_{0.09}Na_{0.06})PS_{4.75}Cl_{1.25}$, $(Li_{5.57}Ag_{0.09}Na_{0.09})PS_{4.75}Cl_{1.25}$, $(Li_{5.51}Ag_{0.12}Na_{0.12})PS_{4.75}Cl_{1.25}$, $(Li_{5.45}Ag_{0.15}Na_{0.15})PS_{4.75}Cl_{1.25}$, $(Li_{5.73}Mg_{0.01}Na_{0.01})PS_{4.75}Cl_{1.25}$, $(Li_{5.71}Mg_{0.02}Na_{0.02})PS_{4.75}Cl_{1.25}$, $(Li_{5.70}Mg_{0.03}Na_{0.02})PS_{4.75}Cl_{1.25}$, $(Li_{5.66}Mg_{0.06}Na_{0.03})PS_{4.75}Cl_{1.25}$, $(Li_{5.63}Mg_{0.06}Na_{0.06})PS_{4.75}Cl_{1.25}$, $(Li_{5.60}Mg_{0.06}Na_{0.09})PS_{4.75}Cl_{1.25}$, $(Li_{5.72}Mg_{0.02}Na_{0.01})PS_{4.75}Cl_{1.25}$, $(Li_{5.71}Mg_{0.3}Na_{0.01})PS_{4.75}Cl_{1.25}$, $(Li_{5.69}Mg_{0.03}Na_{0.03})PS_{4.75}Cl_{1.25}$, $(Li_{5.66}Mg_{0.03}Na_{0.06})PS_{4.75}Cl_{1.25}$, $(Li_{5.60}Mg_{0.09}Na_{0.06})PS_{4.75}Cl_{1.25}$, $(Li_{5.57}Mg_{0.09}Na_{0.09})PS_{4.75}Cl_{1.25}$, $(Li_{5.51}Mg_{0.12}Na_{0.12})PS_{4.75}Cl_{1.25}$, $(Li_{5.45}Mg_{0.15}Na_{0.15})PS_{4.75}Cl_{1.25}$, $(Li_{5.73}Cu_{0.01}K_{0.01})PS_{4.75}Cl_{1.25}$, $(Li_{5.72}Cu_{0.02}K_{0.01})PS_{4.75}Cl_{1.25}$, $(Li_{5.71}Cu_{0.02}K_{0.02})PS_{4.75}Cl_{1.25}$, $(Li_{5.71}Cu_{0.03}K_{0.01})PS_{4.75}Cl_{1.25}$, $(Li_{5.70}Cu_{0.03}K_{0.02})PS_{4.75}Cl_{1.25}$, $(Li_{5.69}Cu_{0.03}K_{0.03})PS_{4.75}Cl_{1.25}$, $(Li_{5.66}Cu_{0.06}K_{0.03})PS_{4.75}Cl_{1.25}$, $(Li_{5.63}Cu_{0.06}K_{0.06})PS_{4.75}Cl_{1.25}$, $(Li_{5.66}Cu_{0.03}K_{0.06})PS_{4.75}Cl_{1.25}$, $(Li_{5.60}Cu_{0.06}K_{0.09})PS_{4.75}Cl_{1.25}$, $(Li_{5.60}Cu_{0.09}K_{0.06})PS_{4.75}Cl_{1.25}$, $(Li_{5.57}Cu_{0.09}K_{0.09})PS_{4.75}Cl_{1.25}$, $(Li_{5.51}Cu_{0.12}K_{0.12})PS_{4.75}Cl_{1.25}$, $(Li_{5.45}Cu_{0.15}K_{0.15})PS_{4.75}Cl_{1.25}$, $(Li_{5.73}Ag_{0.01}K_{0.01})PS_{4.75}Cl_{1.25}$, $(Li_{5.72}Ag_{0.02}K_{0.01})PS_{4.75}Cl_{1.25}$, $(Li_{5.71}Ag_{0.02}K_{0.02})PS_{4.75}Cl_{1.25}$, $(Li_{5.71}Ag_{0.03}K_{0.01})PS_{4.75}Cl_{1.25}$, $(Li_{5.70}Ag_{0.03}K_{0.02})PS_{4.75}Cl_{1.25}$, $(Li_{5.69}Ag_{0.03}K_{0.03})PS_{4.75}Cl_{1.25}$, $(Li_{5.66}Ag_{0.06}K_{0.03})PS_{4.75}Cl_{1.25}$, $(Li_{5.66}Ag_{0.03}K_{0.06})PS_{4.75}Cl_{1.25}$, $(Li_{5.63}Ag_{0.06}K_{0.06})PS_{4.75}Cl_{1.25}$, $(Li_{5.60}Ag_{0.09}K_{0.06})PS_{4.75}Cl_{1.25}$, $(Li_{5.60}Ag_{0.06}K_{0.09})PS_{4.75}Cl_{1.25}$, $(Li_{5.57}Ag_{0.09}K_{0.09})PS_{4.75}Cl_{1.25}$, $(Li_{5.51}Ag_{0.12}K_{0.12})PS_{4.75}Cl_{1.25}$, $(Li_{5.45}Ag_{0.15}K_{0.15})PS_{4.75}Cl_{1.25}$, $(Li_{5.73}Mg_{0.01}K_{0.01})PS_{4.75}Cl_{1.25}$, $(Li_{5.71}Mg_{0.02}K_{0.02})PS_{4.75}Cl_{1.25}$, $(Li_{5.70}Mg_{0.03}K_{0.02})PS_{4.75}Cl_{1.25}$, $(Li_{5.66}Mg_{0.06}K_{0.03})PS_{4.75}Cl_{1.25}$, $(Li_{5.63}Mg_{0.06}K_{0.06})PS_{4.75}Cl_{1.25}$, $(Li_{5.60}Mg_{0.06}K_{0.09})PS_{4.75}Cl_{1.25}$, $(Li_{5.72}Mg_{0.02}K_{0.01})PS_{4.75}Cl_{1.25}$, $(Li_{5.71}Mg_{0.03}K_{0.01})PS_{4.75}Cl_{1.25}$, $(Li_{5.69}Mg_{0.03}K_{0.03})PS_{4.75}Cl_{1.25}$, $(Li_{5.66}Mg_{0.03}K_{0.06})PS_{4.75}Cl_{1.25}$, $(Li_{5.60}Mg_{0.09}K_{0.06})PS_{4.75}Cl_{1.25}$, $(Li_{5.57}Mg_{0.09}K_{0.09})PS_{4.75}Cl_{1.25}$, $(Li_{5.51}Mg_{0.12}K_{0.12})PS_{4.75}Cl_{1.25}$, $(Li_{5.45}Mg_{0.15}K_{0.15})PS_{4.75}Cl_{1.25}$, $(Li_{5.73}Cu_{0.01}Na_{0.01})PS_{4.75}Br_{1.25}$, $(Li_{5.71}Cu_{0.02}Na_{0.02})PS_{4.75}Br_{1.25}$, $(Li_{5.70}Cu_{0.03}Na_{0.02})PS_{4.75}Br_{1.25}$, $(Li_{5.66}Cu_{0.06}Na_{0.03})PS_{4.75}Br_{1.25}$, $(Li_{5.63}Cu_{0.06}Na_{0.06})PS_{4.75}Br_{1.25}$, $(Li_{5.60}Cu_{0.06}Na_{0.09})PS_{4.75}Br_{1.25}$, $(Li_{5.72}Cu_{0.02}Na_{0.01})PS_{4.75}Br_{1.25}$, $(Li_{5.71}Cu_{0.03}Na_{0.01})PS_{4.75}Br_{1.25}$, $(Li_{5.69}Cu_{0.03}Na_{0.03})PS_{4.75}Br_{1.25}$, $(Li_{5.66}Cu_{0.03}Na_{0.06})PS_{4.75}Br_{1.25}$, $(Li_{5.60}Cu_{0.09}Na_{0.06})PS_{4.75}Br_{1.25}$, $(Li_{5.57}Cu_{0.09}Na_{0.09})PS_{4.75}Br_{1.25}$, $(Li_{5.51}Cu_{0.12}Na_{0.12})PS_{4.75}Br_{1.25}$, $(Li_{5.45}Cu_{0.15}Na_{0.15})PS_{4.75}Br_{1.25}$, $(Li_{5.73}Ag_{0.01}Na_{0.01})PS_{4.75}Br_{1.25}$, $(Li_{5.71}Ag_{0.02}Na_{0.02})PS_{4.75}Br_{1.25}$, $(Li_{5.70}Ag_{0.03}Na_{0.02})PS_{4.75}Br_{1.25}$, $(Li_{5.66}Ag_{0.06}Na_{0.03})PS_{4.75}Br_{1.25}$, $(Li_{5.63}Ag_{0.06}Na_{0.06})PS_{4.75}Br_{1.25}$, $(Li_{5.60}Ag_{0.06}Na_{0.09})PS_{4.75}Br_{1.25}$, $(Li_{5.72}Ag_{0.02}Na_{0.01})PS_{4.75}Br_{1.25}$, $(Li_{5.71}Ag_{0.03}Na_{0.01})PS_{4.75}Br_{1.25}$, $(Li_{5.69}Ag_{0.03}Na_{0.03})PS_{4.75}Br_{1.25}$, $(Li_{5.66}Ag_{0.03}Na_{0.06})PS_{4.75}Br_{1.25}$, $(Li_{5.60}Ag_{0.09}Na_{0.06})PS_{4.75}Br_{1.25}$, $(Li_{5.57}Ag_{0.09}Na_{0.09})PS_{4.75}Br_{1.25}$, $(Li_{5.51}Ag_{0.12}Na_{0.12})PS_{4.75}Br_{1.25}$, $(Li_{5.45}Ag_{0.15}Na_{0.15})PS_{4.75}Br_{1.25}$, $(Li_{5.73}Mg_{0.01}Na_{0.01})PS_{4.75}Br_{1.25}$, $(Li_{5.71}Mg_{0.02}Na_{0.02})PS_{4.75}Br_{1.25}$, $(Li_{5.70}Mg_{0.03}Na_{0.02})PS_{4.75}Br_{1.25}$, $(Li_{5.66}Mg_{0.06}Na_{0.03})PS_{4.75}Br_{1.25}$, $(Li_{5.63}Mg_{0.06}Na_{0.06})PS_{4.75}Br_{1.25}$, $(Li_{5.60}Mg_{0.06}Na_{0.09})PS_{4.75}Br_{1.25}$, $(Li_{5.72}Mg_{0.02}Na_{0.01})PS_{4.75}Br_{1.25}$, $(Li_{5.71}Mg_{0.03}Na_{0.01})PS_{4.75}Br_{1.25}$, $(Li_{5.69}Mg_{0.03}Na_{0.03})PS_{4.75}Br_{1.25}$, $(Li_{5.66}Mg_{0.03}Na_{0.06})PS_{4.75}Br_{1.25}$, $(Li_{5.60}Mg_{0.09}Na_{0.06})PS_{4.75}Br_{1.25}$, $(Li_{5.57}Mg_{0.09}Na_{0.09})PS_{4.75}Br_{1.25}$, $(Li_{5.51}Mg_{0.12}Na_{0.12})PS_{4.75}Br_{1.25}$, $(Li_{5.45}Mg_{0.15}Na_{0.15})PS_{4.75}Br_{1.25}$, $(Li_{5.73}Cu_{0.01}K_{0.01})PS_{4.75}Br_{1.25}$, $(Li_{5.72}Cu_{0.02}K_{0.01})PS_{4.75}Br_{1.25}$, $(Li_{5.71}Cu_{0.02}K_{0.02})PS_{4.75}Br_{1.25}$, $(Li_{5.71}Cu_{0.03}K_{0.01})PS_{4.75}Br_{1.25}$, $(Li_{5.70}Cu_{0.03}K_{0.02})PS_{4.75}Br_{1.25}$, $(Li_{5.69}Cu_{0.03}K_{0.03})PS_{4.75}Br_{1.25}$, $(Li_{5.66}Cu_{0.06}K_{0.03})PS_{4.75}Br_{1.25}$, $(Li_{5.66}Cu_{0.03}K_{0.06})PS_{4.75}Br_{1.25}$, $(Li_{5.63}Cu_{0.06}K_{0.06})PS_{4.75}Br_{1.25}$, $(Li_{5.60}Cu_{0.09}K_{0.06})PS_{4.75}Br_{1.25}$, $(Li_{5.60}Cu_{0.06}K_{0.09})PS_{4.75}Br_{1.25}$, $(Li_{5.57}Cu_{0.09}K_{0.09})PS_{4.75}Br_{1.25}$, $(Li_{5.51}Cu_{0.12}K_{0.12})PS_{4.75}Br_{1.25}$, $(Li_{5.45}Cu_{0.15}K_{0.15})PS_{4.75}Br_{1.25}$, $(Li_{5.73}Ag_{0.01}K_{0.01})PS_{4.75}Br_{1.25}$, $(Li_{5.72}Ag_{0.02}K_{0.01})PS_{4.75}Br_{1.25}$, $(Li_{5.71}Ag_{0.02}K_{0.02})PS_{4.75}Br_{1.25}$, $(Li_{5.71}Ag_{0.03}K_{0.01})PS_{4.75}Br_{1.25}$, $(Li_{5.70}Ag_{0.03}K_{0.02})PS_{4.75}Br_{1.25}$, $(Li_{5.69}Ag_{0.03}K_{0.03})PS_{4.75}Br_{1.25}$, $(Li_{5.66}Ag_{0.06}K_{0.03})PS_{4.75}Br_{1.25}$, $(Li_{5.66}Ag_{0.03}K_{0.06})PS_{4.75}Br_{1.25}$, $(Li_{5.63}Ag_{0.06}K_{0.06})PS_{4.75}Br_{1.25}$, $(Li_{5.60}Ag_{0.09}K_{0.06})PS_{4.75}Br_{1.25}$, $(Li_{5.60}Ag_{0.06}K_{0.09})PS_{4.75}Br_{1.25}$, $(Li_{5.57}Ag_{0.09}K_{0.09})PS_{4.75}Br_{1.25}$, $(Li_{5.51}Ag_{0.12}K_{0.12})PS_{4.75}Br_{1.25}$, $(Li_{5.45}Ag_{0.15}K_{0.15})PS_{4.75}Br_{1.25}$, $(Li_{5.73}Mg_{0.01}K_{0.01})PS_{4.75}Br_{1.25}$, $(Li_{5.71}Mg_{0.02}K_{0.02})PS_{4.75}Br_{1.25}$, $(Li_{5.70}Mg_{0.03}K_{0.02})PS_{4.75}Br_{1.25}$, $(Li_{5.66}Mg_{0.06}K_{0.03})PS_{4.75}Br_{1.25}$, $(Li_{5.63}Mg_{0.06}K_{0.06})PS_{4.75}Br_{1.25}$, $(Li_{5.60}Mg_{0.06}K_{0.09})PS_{4.75}Br_{1.25}$, $(Li_{5.72}Mg_{0.02}K_{0.01})PS_{4.75}Br_{1.25}$, $(Li_{5.71}Mg_{0.03}K_{0.01})PS_{4.75}Br_{1.25}$, $(Li_{5.69}Mg_{0.03}K_{0.03})PS_{4.75}Br_{1.25}$, $(Li_{5.66}Mg_{0.03}K_{0.06})PS_{4.75}Br_{1.25}$, $(Li_{5.60}Mg_{0.09}K_{0.06})PS_{4.75}Br_{1.25}$, $(Li_{5.57}Mg_{0.9}K_{0.09})PS_{4.75}Br_{1.25}$, $(Li_{5.51}Mg_{0.12}K_{0.12})PS_{4.75}Br_{1.25}$, $(Li_{5.45}Mg_{0.15}K_{0.15})PS_{4.75}Br_{1.25}$, $(Li_{5.73}Cu_{0.01}Na_{0.01})PS_{4.75}I_{1.25}$, $(Li_{5.72}Cu_{0.02}Na_{0.01})PS_{4.75}I_{1.25}$, $(Li_{5.71}Cu_{0.2}Na_{0.02})PS_{4.75}I_{1.25}$, $(Li_{5.71}Cu_{0.01}Na_{0.01})PS_{4.75}I_{1.25}$, $(Li_{5.70}Cu_{0.03}Na_{0.02})PS_{4.75}I_{1.25}$, $(Li_{5.69}Cu_{0.3}Na_{0.03})PS_{4.75}I_{1.25}$, $(Li_{5.66}Cu_{0.06}Na_{0.03})PS_{4.75}I_{1.25}$, $(Li_{5.66}Cu_{0.03}Na_{0.06})PS_{4.75}I_{1.25}$, $(Li_{5.63}Cu_{0.06}Na_{0.06})PS_{4.75}I_{1.25}$, $(Li_{5.60}Cu_{0.09}Na_{0.06})PS_{4.75}I_{1.25}$, $(Li_{5.60}Cu_{0.06}Na_{0.09})PS_{4.75}I_{1.25}$, $(Li_{5.57}Cu_{0.09}Na_{0.09})PS_{4.75}I_{1.25}$, $(Li_{5.51}Cu_{0.12}Na_{0.12})PS_{4.75}I_{1.25}$, $(Li_{5.45}Cu_{0.15}Na_{0.15})PS_{4.75}I_{1.25}$, $(Li_{5.73}Ag_{0.01}Na_{0.01})PS_{4.75}I_{1.25}$, $(Li_{5.72}Ag_{0.02}Na_{0.01})PS_{4.75}I_{1.25}$, $(Li_{5.71}Ag_{0.02}Na_{0.02})PS_{4.75}I_{1.25}$, $(Li_{5.71}Ag_{0.03}Na_{0.01})PS_{4.75}I_{1.25}$, $(Li_{5.70}Ag_{0.03}Na_{0.02})PS_{4.75}I_{1.25}$, $(Li_{5.69}Ag_{0.03}Na_{0.03})PS_{4.75}I_{1.25}$, $(Li_{5.66}Ag_{0.06}Na_{0.03})PS_{4.75}I_{1.25}$, $(Li_{5.66}Ag_{0.03}Na_{0.06})PS_{4.75}I_{1.25}$, $(Li_{5.63}Ag_{0.06}Na_{0.06})PS_{4.75}I_{1.25}$, $(Li_{5.60}Ag_{0.09}Na_{0.06})PS_{4.75}I_{1.25}$, $(Li_{5.60}Ag_{0.06}Na_{0.09})PS_{4.75}I_{1.25}$, $(Li_{5.57}Ag_{0.09}Na_{0.09})PS_{4.75}I_{1.25}$, $(Li_{5.51}Ag_{0.12}Na_{0.12})PS_{4.75}I_{1.25}$, $(Li_{5.45}Ag_{0.15}Na_{0.15})PS_{4.75}I_{1.25}$, $(Li_{5.73}Mg_{0.01}Na_{0.01})PS_{4.75}I_{1.25}$, $(Li_{5.72}Mg_{0.02}Na_{0.01})PS_{4.75}I_{1.25}$, $(Li_{5.71}Mg_{0.02}Na_{0.02})PS_{4.75}I_{1.25}$, $(Li_{5.71}Mg_{0.03}Na_{0.01})PS_{4.75}I_{1.25}$, $(Li_{5.7}Mg_{0.03}Na_{0.02})PS_{4.75}I_{1.25}$, $(Li_{5.69}Mg_{0.03}Na_{0.03})PS_{4.75}I_{1.25}$, $(Li_{5.66}Mg_{0.06}Na_{0.03})PS_{4.75}I_{1.25}$, $(Li_{5.66}Mg_{0.03}Na_{0.06})PS_{4.75}I_{1.25}$, $(Li_{5.63}Mg_{0.06}Na_{0.06})PS_{4.75}I_{1.25}$, $PS_{4.75}I_{1.25}$, $(Li_{5.6}Mg_{0.09}Na_{0.06})PS_{4.75}I_{1.25}$, $(Li_{5.6}Mg_{0.06}Na_{0.09})PS_{4.75}I_{1.25}$, $(Li_{5.57}Mg_{0.09}Na_{0.09})PS_{4.75}I_{1.25}$, $(Li_{5.51}Mg_{0.12}Na_{0.12})PS_{4.75}I_{1.25}$, $(Li_{5.45}Mg_{0.15}Na_{0.15})PS_{4.75}I_{1.25}$,
$(Li_{5.73}Cu_{0.01}K_{0.01})PS_{4.75}I_{1.25}$, $(Li_{5.72}Cu_{0.02}K_{0.01})PS_{4.75}I_{1.25}$, $(Li_{5.71}Cu_{0.02}K_{0.02})PS_{4.75}I_{1.25}$, $(Li_{5.71}Cu_{0.03}K_{0.01})PS_{4.75}I_{1.25}$, $(Li_{5.70}Cu_{0.03}K_{0.02})PS_{4.75}I_{1.25}$, $(Li_{5.69}Cu_{0.03}K_{0.03})PS_{4.75}I_{1.25}$, $(Li_{5.66}Cu_{0.06}K_{0.03})PS_{4.75}I_{1.25}$, $(Li_{5.66}Cu_{0.03}K_{0.06})PS_{4.75}I_{1.25}$, $(Li_{5.63}Cu_{0.06}K_{0.06})PS_{4.75}I_{1.25}$, $(Li_{5.60}Cu_{0.09}K_{0.06})PS_{4.75}I_{1.25}$, $(Li_{5.60}Cu_{0.06}K_{0.09})PS_{4.75}I_{1.25}$, $(Li_{5.57}Cu_{0.09}K_{0.09})PS_{4.75}I_{1.25}$, $(Li_{5.51}Cu_{0.12}K_{0.12})PS_{4.75}I_{1.25}$, $(Li_{5.45}Cu_{0.15}K_{0.15})PS_{4.75}I_{1.25}$,
$(Li_{5.73}Ag_{0.01}K_{0.01})PS_{4.75}I_{1.25}$, $(Li_{5.72}Ag_{0.02}K_{0.01})PS_{4.75}I_{1.25}$, $(Li_{5.71}Ag_{0.02}K_{0.02})PS_{4.75}I_{1.25}$, $(Li_{5.71}Ag_{0.03}K_{0.01})PS_{4.75}I_{1.25}$, $(Li_{5.70}Ag_{0.03}K_{0.02})PS_{4.75}I_{1.25}$, $(Li_{5.69}Ag_{0.03}K_{0.03})PS_{4.75}I_{1.25}$, $(Li_{5.66}Ag_{0.06}K_{0.03})PS_{4.75}I_{1.25}$, $(Li_{5.66}Ag_{0.03}K_{0.06})PS_{4.75}I_{1.25}$, $(Li_{5.63}Ag_{0.06}K_{0.06})PS_{4.75}I_{1.25}$, $(Li_{5.60}Ag_{0.09}K_{0.06})PS_{4.75}I_{1.25}$, $(Li_{5.60}Ag_{0.06}K_{0.09})PS_{4.75}I_{1.25}$, $(Li_{5.57}Ag_{0.09}K_{0.09})PS_{4.75}I_{1.25}$, $(Li_{5.51}Ag_{0.12}K_{0.12})PS_{4.75}I_{1.25}$, $(Li_{5.45}Ag_{0.15}K_{0.15})PS_{4.75}I_{1.25}$,
$(Li_{5.73}Mg_{0.01}K_{0.01})PS_{4.75}I_{1.25}$, $(Li_{5.72}Mg_{0.02}K_{0.01})PS_{4.75}I_{1.25}$, $(Li_{5.71}Mg_{0.02}K_{0.02})PS_{4.75}I_{1.25}$, $(Li_{5.71}Mg_{0.03}K_{0.01})PS_{4.75}I_{1.25}$, $(Li_{5.70}Mg_{0.03}K_{0.02})PS_{4.75}I_{1.25}$, $(Li_{5.69}Mg_{0.03}K_{0.03})PS_{4.75}I_{1.25}$, $(Li_{5.66}Mg_{0.06}K_{0.03})PS_{4.75}I_{1.25}$, $(Li_{5.63}Mg_{0.06}K_{0.06})PS_{4.75}I_{1.25}$, $(Li_{5.60}Mg_{0.09}K_{0.06})PS_{4.75}I_{1.25}$, $(Li_{5.60}Mg_{0.06}K_{0.09})PS_{4.75}I_{1.25}$, $(Li_{5.57}Mg_{0.09}K_{0.09})PS_{4.75}I_{1.25}$, $(Li_{5.51}Mg_{0.12}K_{0.12})PS_{4.75}I_{1.25}$, or $(Li_{5.45}Mg_{0.15}K_{0.15})PS_{4.75}I_{1.25}$.

In an embodiment, a portion of the S in the solid ion conductor compound represented by Formula 1 may be additionally substituted with $SO_4$.

In the case in which a portion of the S in the solid ion conductor compound represented by Formula 1 is additionally substituted with $SO_4$, the solid ion conductor compound may be represented by, for example, Formula 6:

$$Li_aM1_xM2_wPS_{y-p}(SO_4)_pM3_z \quad \text{Formula 6}$$

wherein M1 may be at least one element of Group 2 or Group 11 of the periodic table, M2 may be other than Li and at least one metal element of Group 1 of the periodic table, M3 may be at least one element of Group 17 of the periodic table, and the conditions of $4 \leq a \leq 8$, $0 < x < 0.5$, $0 \leq w < 0.5$, $3 \leq y \leq 7$, $0 < p < 2$, and $0 \leq z \leq 2$ may be satisfied. In Formula 6, for example, the condition of $0 < p \leq 1.5$, $0 < p \leq 1.0$, $0 < p \leq 0.5$, $0 < p \leq 0.25$, $0 < p \leq 0.2$, $0 < p \leq 0.1$, $0 < p \leq 0.075$, $0 < p \leq 0.05$, or $0 < p \leq 0.03$ may be satisfied.

The solid ion conductor compound represented by Formula 1 provides improved lithium ion conductivity. The solid ion conductor compound represented by Formula 1 may provide an ion conductivity of at least 0.5 milliSiemens per centimeter (mS/cm), at least about 0.6 mS/cm, at least about 1.0 mS/cm, at least about 1.5 mS/cm, at least about 2.0 mS/cm, at least about 2.5 mS/cm, or at least about 3.0 mS/cm, as measured at room temperature, for example, about 25° C. The solid ion conductor compound represented by Formula 1 may provide an ion conductivity of about 0.5 mS/cm to about 500 mS/cm, about 0.6 mS/cm to about 500 mS/cm, about 1.0 mS/cm to about 400 mS/cm, about 1.5 mS/cm to about 300 mS/cm, about 2.0 mS/cm to about 200 mS/cm, about 2.5 mS/cm to about 100 mS/cm, or about 3.0 mS/cm to about 100 mS/cm, at room temperature, for example, about 25° C. Therefore, an electrochemical cell including: a cathode; an anode; and the solid ion conductor compound represented by 1 Formula and located between the cathode and the anode, wherein the electrochemical cell effectively performs ion transfer between the cathode and the anode, thereby reducing internal resistance between the cathode and the anode. The ion conductivity may be measured by using a direction current (DC) polarization method. In an embodiment, the ion conductivity may be measured by using a complex impedance method.

The solid ion conductor compound represented by Formula 1, for example, may have an ion conductivity retention of about 70% or more, e.g., about 70% to about 99%, or about 75% to about 95%, after 10 days in dry conditions, e.g., in an air atmosphere having a dew point of less than −60° C. The ion conductivity retention may be expressed by, for example, Equation 1. In Equation 1, the ionic conductivity of the initial solid ion conductor compound is referring to the ionic conductivity of the solid ion conductor compound before being stored in a dry condition.

Ionic Conductivity Retention=[Ion Conductivity of Solid Ion Conductor Compound after 10 Days Elapsed/Initial Ion Conductivity of Solid Ion Conductor Compound]×100%   Equation 1

The solid ion conductor compound represented by Formula 1 may belong to, for example, a cubic crystal system, and more specifically, may have a F-43m space group. In addition, the solid ion conductor compound represented by Formula 1 may be an argyrodite-type sulfide having an argyrodite-type crystal structure. The solid ion conductor compound represented by Formula 1 includes a lithium site in the argyrodite-type crystal structure, wherein at least one monovalent or divalent element, e.g., a $M1^+$ cationic element, $M1^{2+}$ cationic element, or $M2^+$ cationic element, is substituted in the region of the lithium site, thereby providing both improved lithium ion conductivity and electrochemical stability for lithium metal.

The solid ion conductor compound represented by Formula 1 may have a peak, when analyzed by X-ray diffraction using CuKα radiation, for example, at a location of about 25.48° 2θ±0.50° 2θ, about 30.01° 2θ±0.50° 2θ, about 31.38° 2θ±0.50° 2θ, about 46.0° 2θ±1.0° 2θ, about 48.5° 2θ±1.0° 2θ, or about 53.0° 2θ±1.0° 2θ. The solid ion conductor compound represented by Formula 1 has the argyrodite structure, thereby the compound may have the peak having characteristics as such to be described in an XRD spectrum using CuKα radiation.

The solid ion conductor compound represented by Formula 1, wherein the compound has a peak intensity (Ia) at a diffraction angle 2θ=46.0° 2θ±1.0° 2θ with respect to a peak intensity (Ib) at a diffraction angle of about 53.0° 2θ±1.0° 2θ in an XRD spectrum using CuKα radiation, may have a peak intensity ratio Ia/Ib of about 1 or less, about 0.95 or less, about 0.90 or less, about 0.85 or less, or about 0.80 or less. By having the peak intensity ratio in range of about 0.1 to about 0.95, about 0.2 to about 0.9, or about 0.3 to about 0.8, the ion conductivity of the solid ion conductor compound may be further improved.

The solid ion conductor compound represented by Formula 1 has a full width at half maximum (FWHM) of about 0.30° 2θ or less, about 0.28° 2θ or less, about 0.26° 2θ or less, about 0.24° 2θ or less, about 0.22° 2θ or less, about 0.20° 2θ or less, about 0.18° 2θ or less, about 0.16° 2θ or less, about 0.14° 2θ or less, about 0.12° 2θ or less, or about 0.10° 2θ or less, e.g., about 0.01° 2θ to about 0.3° 2θ, about 0.05° 2θ to about 0.2° 2θ in the XRD spectrum using CuKα radiation at a diffraction angle of 46.0° 2θ±1.0° 2θ. By having the full width at half maximum in range as such, the ion conductivity of the solid ion conductor compound may be further improved.

Solid Electrolyte

The solid electrolyte according to another embodiment includes the solid ion conductor compound represented by Formula 1. The solid electrolyte may have high ion conductivity and high chemical stability by including such solid ion conductor compound. A solid electrolyte including the solid ion conductor compound represented by Formula 1 may provide improved stability to air, and may provide electrochemical stability for lithium metal. Therefore, the solid ion conductor compound represented by Formula 1 may be used as, for example, the solid electrolyte in the electrochemical cell.

The solid electrolyte may include a second solid electrolyte in addition to the solid ion conductor compound represented by Formula 1. For example, the solid electrolyte may further include a sulfide-based solid electrolyte and/or oxide-based solid electrolyte. The solid ion conductor compounds which are additionally included may be, for example, at least one of $Li_2O$—$Al_2O_3$—$TiO_2$—$P_2O_5$ (LATP), a compound with the formula $Li_{2+2x}Zn_{1-x}GeO_4$, wherein $0<x<1$ (LISICON), $Li_{3-y}PO_{4-x}N_x$, $0<y<3$, $0<x<4$ (LIPON), $Li_{3.25}Ge_{0.25}P_{0.75}S_4$ (Thio-LISICON), $Li_2S$, $Li_2S$—$P_2S_3$, $Li_2S$—$SiS_3$, $Li_2S$—$GeS_3$, $Li_2S$—$B_2S_3$, or $Li_2S$—$Al_2S_3$, but are not limited thereto.

The solid electrolyte may be in the form of a powder or a monolith. The solid electrolyte in the form of the monolith may be, for example, having the form of a pellet, sheet, or film, but is not limited thereto, and may have any suitable form.

Electrochemical Cell

The electrochemical cell according to an embodiment, includes: a cathode layer including a cathode active material layer; an anode layer including an anode active material layer; and an electrolyte layer located between the anode layer and the cathode layer, and the cathode active material layer and/or the electrolyte layer include the solid ion conductor compound represented by Formula 1. The electrochemical cell includes the solid ion conductor compound represented by Formula 1, thereby the ion conductivity of lithium ion and the stability for lithium metal of the electrochemical cell are improved.

The electrochemical cell may be, for example, an all-solid secondary battery, a liquid electrolyte-containing secondary battery, or a lithium air battery, but is not limited thereto, and may be any electrochemical cell that can be used in the art.

Hereinafter, the all-solid secondary battery will be described in more detail.

All-Solid Secondary Battery

The all-solid secondary battery may include the solid ion conductor compound represented by Formula 1.

The all-solid secondary battery includes, for example, the cathode layer including the cathode active material layer; the anode layer including the anode active material layer; and the electrolyte layer located between the cathode layer and the anode layer, and the cathode active material layer and/or the electrolyte layer may include the solid ion conductor compound represented by Formula 1.

The all-solid secondary battery according to an embodiment may be prepared as follows.

Solid Electrolyte Layer

The solid electrolyte layer may be prepared by mixing and drying the solid ion conductor compound represented by Formula 1 and a binder, or by rolling the powder of the solid ion conductor compound represented by Formula 1 at a pressure of 1 ton to 10 tons in a uniform form. The solid ion conductor compound represented by Formula 1 is used as the solid electrolyte.

An average particle diameter of the solid electrolyte may be, for example, from about 0.5 micrometers (μm) to about 20 μm, or about 1 μm to about 15 μm, or about 1 μm to about 10 μm. The solid electrolyte having the average particle diameter as such improves the binding property during the formation of the sintered body, thereby improving the ion conductivity and the lifespan characteristics of the solid electrolyte particles.

A thickness of the solid electrolyte layer may be from about 10 μm to about 200 μm, or about 20 μm to about 150 μm, or about 30 μm to about 100 μm. The solid electrolyte layer having the thickness as such ensures a sufficient moving speed of lithium ions, thereby obtaining high ion conductivity.

The solid electrolyte layer may further include a second solid electrolyte such as a sulfide-based solid electrolyte and/or an oxide-based solid electrolyte in addition to the solid ion conductor compound represented by Formula 1.

The sulfide based solid electrolyte may include, for example, at least one of lithium sulfide, silicon sulfide, phosphorus sulfide, or boron sulfide. The sulfide-based solid electrolyte particle may include at least one of $Li_2S$, $P_2S_5$, $SiS_2$, $GeS_2$, or $B_2S_3$. The sulfide-based solid electrolyte particles may be $Li_2S$ or $P_2S_5$. The sulfide-based solid electrolyte particles may have higher lithium ion conductivity than other inorganic compounds. For example, the sulfide-based solid electrolyte includes $Li_2S$ or $P_2S_5$. In case the sulfide-based solid electrolyte materials constituting the sulfide-based solid electrolyte includes $Li_2S$—$P_2S_5$, the molar ratio of $Li_2S$—$P_2S_5$ may be, for example, in the range of about 50:50 to about 90:10. In addition, $Li_3PO_4$, a halogen, a halogen compound, $Li_{2+2x}Zn_{1-x}GeP_4$ $0<x<1$ (LISICON), $Li_{3+y}PO_{4-x}N_x$ $0<x<4$ (LIPON, $0<y<3$), $Li_{3.25}Ge_{0.25}P_{0.75}S_4$ (Thio-LISICON), $Li_2O$—$Al_2O_3$—$TiO_2$—$P_2O_5$(LATP), may be added to the inorganic solid electrolyte comprising at least one of $Li_2S$—$P_2S_5$, $SiS_2$, $GeS_2$, or $B_2S_3$, wherein the resulting inorganic solid electrolyte may be used as the sulfide-based solid electrolyte. Non-limiting examples of the sulfide-based solid electrolyte include $Li_2S$—$P_2S_5$; $Li_2S$—$P_2S_5$—$LiX$ (wherein X is a halogen element); $Li_2S$—$P_2S_5$—$Li_2O$; $Li_2S$—$P_2S_5$—$Li_2O$—$LiI$; $Li_2S$—$SiS_2$; $Li_2S$—$SiS_2$—$LiI$; $Li_2S$—$SiS_2$—$LiBr$; $Li_2S$—$SiS_2$—$LiCl$; $Li_2S$—$SiS_2$—$B_2S_3$—$LiI$; $Li_2S$—$SiS_2$—$P_2S_5$—$LiI$; $Li_2S$—$B_2S_3$; $Li_2S$—$P_2S_5$—$Z_mS_n$ (m and n are positive numbers, and Z is Ge, Zn or Ga); $Li_2S$—$GeS_2$; $Li_2S$—$SiS_2$—$Li_3PO_4$; and $Li_2S$—$SiS_2$—$Li_pMO_q$ (p and q are positive numbers, and M is P, Si, Ge, B, Al, Ga, or In). Moreover, the sulfide-based solid electrolyte material may be prepared by treating starting materials (e.g., $Li_2S$, $P_2S_5$) of the sulfide-based solid electrolyte materials by a melt quenching method, or a mechanical milling method. In addition, a calcination process may be performed for the materials after the treatment thereby.

The binder included in the solid electrolyte layer may be, for example, styrene butadiene rubber (SBR), polytetrafluoroethylene, polyvinylidene fluoride, polyethylene, polyvinyl alcohol, and the like. The disclosed aspect is not limited thereto, and any suitable binder can be used. The binder of the solid electrolyte layer may be the same or different from the binder of the cathode layer and the anode layer.

Cathode Layer

Next, the cathode layer is prepared.

The cathode layer may be prepared by forming the cathode active material layer including a cathode active material over a current collector. The average particle diameter of the cathode active material may be, for example, from 2 μm to 10 μm.

Any suitable cathode active material may be used. For example, the cathode active material may be a lithium transition metal oxide, a transition metal sulfide, or the like. For example, one or more composite oxides, each including lithium and at least one metal of cobalt, manganese, or nickel, may be used, and specifically, a cathode active material represented by at least one of the formulas may be used: $Li_aA_{1-b}B'_bD_2$ (wherein $0.90 \leq a \leq 1.8$ and $0 \leq b \leq 0.5$); $Li_aE_{1-b}B'_bO_{2-c}D_c$ (wherein $0.90 \leq a \leq 1.8$, $0 \leq b \leq 0.5$, $0 \leq c \leq 0.05$); $LiE_{2-b}B'_bO_{4-c}D_c$ (wherein $0 \leq b \leq 0.5$ and $0 \leq c \leq 0.05$ $Li_aNi_{1-b-c}Co_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein, $0.90 \leq a \leq 1.8$, $0 \leq b \leq 0.5$, $0 \leq c \leq 0.5$, $0 \leq d \leq 0.5$, and $0.001 \leq e \leq 0.1$); $Li_aNiG_bO_2$ (wherein, $0.90 \leq a \leq 1.8$, $0.001 \leq b \leq 0.1$); $Li_aCoG_bO_2$ (wherein, $0.90 \leq a \leq 1.8$, $0.001 \leq b \leq 0.1$); $Li_aMnG_bO_2$ (wherein, $0.90 \leq a \leq 1.8$, $0.001 \leq b \leq 0.1$); $Li_aMn_2G_bO_4$ (wherein, $0.90 \leq a \leq 1.8$, $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$. In Formulas above, A is at least one of Ni, Co, or Mn; B' is at least one of Al, Ni, Co, Mn, Cr, Fe, Mg, Sr, V, or a rare earth element; D is at least one of 0, F, S, or P; E is at least one of Co or Mn; F' is at least one of F, S, or P; G is at least one of Al, Cr, Mn, Fe, Mg, La, Ce, Sr, or V; Q is at least one of Ti, Mo, or Mn; I' is at least one of Cr, V, Fe, Sc, or Y; and J is at least one of V, Cr, Mn, Co, Ni, or Cu. For example, the cathode active material may comprise $LiCoO_2$, $LiMn_xO_{2x}$ ($x=1$, 2), $LiNi_{1-x}Mn_xO_{2x}$ ($0<x<1$), $Ni_{1-x-y}Co_xMn_yO_2$ ($0 \leq x \leq 5$, $0 \leq y \leq 5$), $Ni_{1-x-y}Co_xAl_yO_2$ ($0 \leq x \leq 5$, $0 \leq y \leq 5$), $LiFePO_4$, $TiS_2$, $FeS_2$, $TiS_3$, or $FeS_3$.

A compound having a coating layer added to the surface of the above-described compound may be used, and a mixture having the above-described compound and the compound having the coating layer may also be used. The coating layers added to the surface of such compounds include, for example, coating element compounds of oxides of coating elements, hydroxides of coating elements, oxyhydroxides of coating elements, oxycarbonates of coating elements, or hydroxycarbonates of coating elements. The compound constituting the coating layer as such is amorphous or crystalline. The coating elements included in the coating layer may be at least one of Mg, Al, Co, K, Na, Ca, Si, Ti, V, Sn, Ge, Ga, B, As, or Zr. A method of forming the coating layer is selected within a range in which the physical properties of the cathode active material are not adversely affected. Coating methods are, for example, spray coating, dipping, etc. The specific coating method is well understood to those of ordinary skill in the art, and thus a detailed description thereof will be omitted.

The cathode active material includes, for example, a lithium salt of a transition metal oxide having a layered rock salt type structure among the lithium transition metal oxides described above. Herein, "layered rock salt structure" refers to, for example, a structure wherein an alternating, uniform arrangement of oxygen and metal atomic layers are positioned in the <111> direction having a cubic rock salt type structure, whereby each atomic layer is a two-dimensional plane. "Cubic rock salt structure" refers to a NaCl type structure, which is a kind of crystal structure, and more specifically, wherein face centered cubic lattices (FCCs), which are formed of cations and anions, respectively, are arranged having each unit lattice offset by one-half of the ridge of the unit lattice. The lithium transition metal oxide having such layered rock salt structure is, for example, ternary lithium transition metal oxides such as $LiNi_xCo_yAl_zO_2$ (NCA) or $LiNi_xCo_yMn_zO_2$ (NCM) ($0<x<1$, $0<y<1$, $0<z<1$, $x+y+z=1$). In case the cathode active material includes a ternary lithium transition metal oxide having the layered rock salt structure, the energy density and thermal stability of the all-solid secondary battery 1 are further improved.

The cathode active material may be covered by the coating layer as described above. The coating layer may be any of the known coating layer of the cathode active material of the all-solid secondary battery. The coating layer is, for example, $Li_2O$—$ZrO_2$ (LZO) and the like.

In case the cathode active material contains nickel (Ni) as the ternary lithium transition metal oxide such as NCA or NCM, for example, the capacity density of the all-solid secondary battery is increased, thereby reducing the metal dissolution of the cathode active material in the charged state. As a result, the cycle characteristic of the all-solid secondary battery is improved.

The shape of the positive electrode active material is, for example, a particle shape such as a true sphere or an elliptic sphere. The particle diameter of the cathode active material is not particularly limited and is in a range suitable for the cathode active material of the all-solid secondary battery. The amount of the cathode active material of the cathode layer is also not particularly limited, and is in a range suitable to the cathode layer of the all-solid secondary battery. The amount of the cathode active material in the cathode active material layer may be, for example, 50 to 95% by weight.

The cathode active material layer may further include the solid ion conductor compound represented by Formula 1.

The cathode active material layer may include the binder. The binder is, for example, styrene butadiene rubber (SBR), polytetrafluoroethylene, polyvinylidene fluoride, polyethylene, or the like.

The cathode active material layer may include a conductive material. The conductive material is, for example, graphite, carbon black, acetylene black, Ketjen black, carbon fiber, metal powder or the like.

The cathode active material layer may further include, for example, an additive such as a filler, a coating agent, a dispersant, and an ion conductive assistant, in addition to the cathode active material, the solid electrolyte, the binder, and the conductive material as described above.

The filler, the coating agent, the dispersant, or the ion conductive aid, which may be included in the cathode active material layer, may be any suitable material for an electrode of the all-solid secondary battery.

A cathode current collector use, for example, a plate, or a foil, comprising at least one of aluminum (Al), indium (In), copper (Cu), magnesium (Mg), stainless steel, titanium (Ti), iron (Fe), cobalt (Co), nickel (Ni), zinc (Zn), germanium (Ge), lithium (Li), or an alloy thereof. The cathode current collector may be omitted.

The cathode current collector may further include a carbon layer located on one or both surfaces of a metal substrate. Depositing the carbon layer additionally on top of the metal substrate prevents the metal of the metal substrate from being corroded by the solid electrolyte included in the cathode layer and reduces the interfacial resistance between the cathode active material layer and the cathode current collector. The thickness of the carbon layer may be, for example, from 1 μm to 5 μm. In case the thickness of the carbon layer is substantially thin, completely blocking the contact between the metal substrate and the solid electrolyte may be difficult. In case the thickness of the carbon layer is substantially thick, the energy density of the all-solid secondary battery may decrease. The carbon layer may include amorphous carbon, crystalline carbon, and the like.

Anode Layer

The anode layer may be manufactured in the same manner as the cathode layer except that the anode active material is used instead of the cathode active material. The anode layer may be prepared by forming the anode active material layer including the anode active material on top of an anode current collector.

The anode active material layer may further include the solid ion conductor compound represented by Formula 1 as described above.

The anode active material may be at least one of lithium metal or a lithium metal alloy.

The anode active material layer may further include a second anode active materials in addition to at least one of lithium metal, or a lithium metal alloy. The second anode active material may include, for example, at least one of a metal alloying with lithium, a transition metal oxide, a non-transition metal oxide, or a carbon-based material. Metals/metalloids alloying with lithium are, for example, Ag, Si, Sn, Al, Ge, Pb, Bi, Sb Si—Y' alloys (wherein, Y' is an alkali metal, an alkaline earth metal, a Group 13 element, a Group 14 element, a Group 15 element, a Group 16 element, a transition metal, a rare earth element, or an element in combination thereof excluding Si), Sn—Y' alloy (wherein, Y' is an alkali metal, an alkaline earth metal, a Group 13 element, a Group 14 element, a Group 15 element, a Group 16 element, a transition metal, a rare earth element, or an element in combination thereof excluding Sn), and the like. The element Y' may be at least one of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, or Po. The transition metal oxide may be, for example, at least one of lithium titanium oxide, vanadium oxide, or lithium vanadium oxide. The non-transition metal oxide may be, for example, at least one of $SnO_2$, or $SiO_x$ ($0<x<2$). The carbon-based material may be, for example, a crystalline carbon, an amorphous carbon, or a mixture thereof. The crystalline carbon may be amorphous, plate, flake, spherical, or fibrous natural graphite or artificial graphite thereof, and the amorphous carbon may be soft carbon or hard carbon, mesophase pitch carbonization product, calcined coke, and the like.

Figure 4:
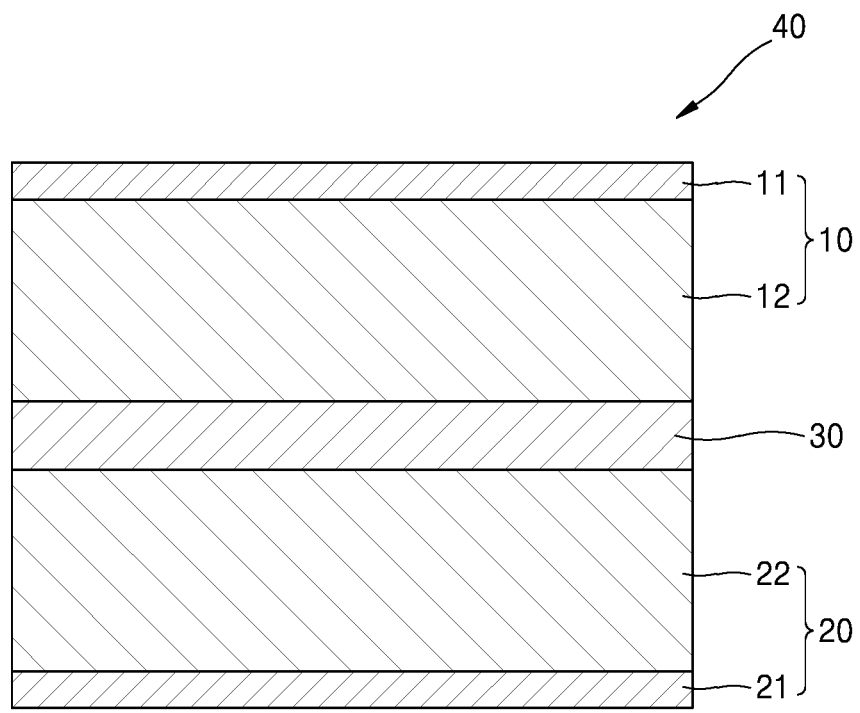
FIG. 4 is a schematic diagram of an embodiment of an all-solid secondary battery.

Referring to FIG. 4, the all-solid secondary battery 40 according to the embodiment may include the solid electrolyte layer 30, wherein the cathode layer 10 is located on one surface of the solid electrolyte layer 30, and the anode layer 20 is located on another surface of the solid electrolyte layer 30. The cathode layer 10 includes the cathode active material layer 12 located in contact with the solid electrolyte layer 30 and the cathode current collector 11 positioned in contact with the cathode active material layer 12, and the anode layer 20 includes the anode active material layer 22 located in contact with the solid electrolyte layer 30 and the anode current collector 21 positioned in contact with the anode active material layer 22. The all-solid secondary battery 1 is including, for example, the cathode active material layer 12 and the anode active material layer 22 located on both surfaces of the solid electrolyte layer 30, and the cathode current collector 11 and the anode current collector 21 respectively formed on top of the surface of the cathode active material layer 12 and the anode active material layer 22, whereby the all-solid secondary battery 1 is complete. Alternatively, the anode active material layer 22, the solid electrolyte layer 30, the cathode active material layer 12, and the cathode current collector 11 are sequentially located on the anode current collector 21 to form the all-solid secondary battery 1.

All-Solid Secondary Battery

Figure 5:
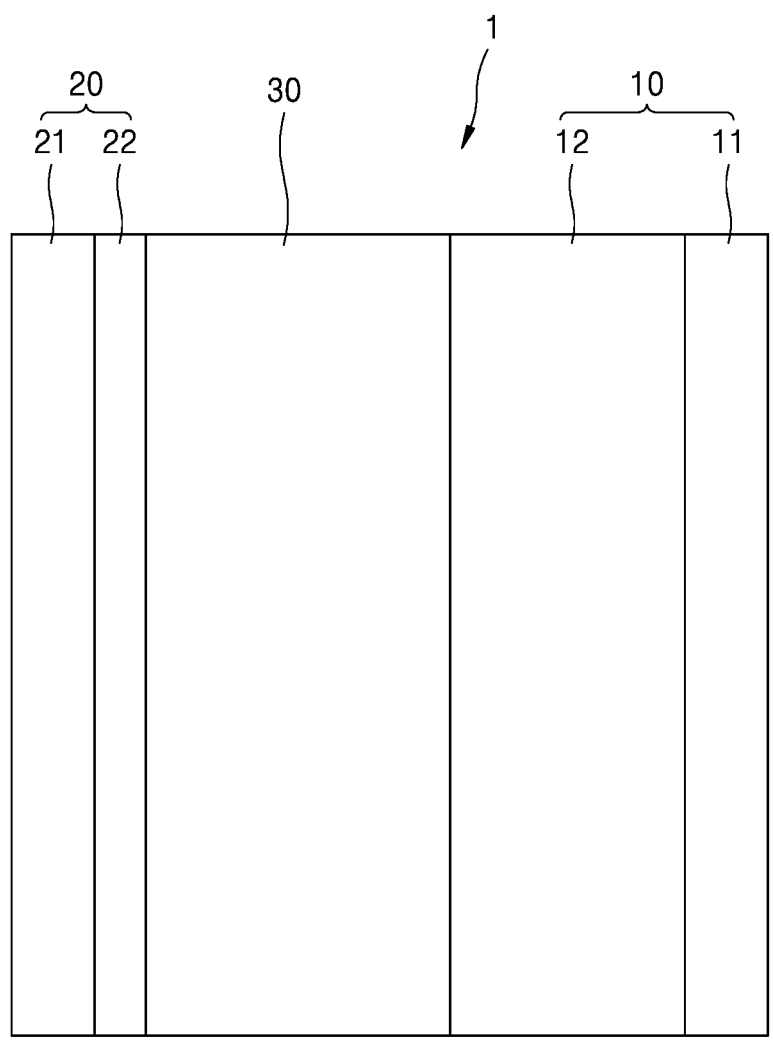
FIG. 5 is a schematic diagram of another embodiment of the all-solid secondary battery.

Referring to FIGS. 5 to 6, the all-solid secondary battery 1 may include, for example, the cathode layer 10 including the cathode active material layer 12 located on top of the cathode current collector 11; the anode layer 20 including the anode active material layer 22 located on top of the anode current collector 21; and the electrolyte layer 30 located between the cathode layer 10 and the anode layer 20, wherein the cathode active material layer 12 and/or the electrolyte layer 30 may include the solid ion conductor compound represented by Formula 1.

The all-solid secondary battery according to another embodiment may be prepared as follows.

The cathode layer and the solid electrolyte layer may be manufactured in the same manner as the all-solid secondary battery as described above.

Anode Layer

Referring to FIGS. 5 to 6, the anode layer 20 includes the anode current collector 21 and the anode active material layer 22 located on top of the anode current collector 21, wherein the anode active material layer 22 includes, for example, the anode active material and the binder.

The anode active material included in the anode active material layer 22 has, for example, a particle form. The average particle diameter of the anode active material having the particle form is, for example, about 4 μm or less, about 3 μm or less, about 2 μm or less, about 1 μm or less, or about 900 nm or less. The average particle diameter of the anode active material having the particle form is, for example, about 10 nm to about 4 μm, about 10 nm to about 3 μm, about 10 nm to about 2 μm, about 10 nm to about 1 μm, or about 10 nm to about 900 nm. The anode active material having the average particle diameter in such range may provide relatively easier reversible absorbing and/or desorbing of lithium during charge and discharge. The average particle diameter of the anode active material is, for example, a median diameter (D50) measured using a laser particle size distribution meter.

The anode active material included in the anode active material layer 22 includes, for example, at least one of a carbon-based anode active material or a metal or metalloid anode active material.

The carbon-based anode active material is particularly amorphous carbon. The amorphous carbon is, for example, carbon black (CB), acetylene black (AB), furnace black (FB), ketjen black (KB), graphene, and the like, but is not necessarily limited thereto, and may be any one classified as amorphous carbon in the art. The amorphous carbon is carbon having no crystallinity or very low crystallinity, and is distinguished from crystalline carbon or graphite carbon.

The metal or metalloid anode active materials include one or more elements of gold (Au), platinum (Pt), palladium (Pd), silicon (Si), silver (Ag), aluminum (Al), bismuth (Bi), tin (Sn), and zinc, but are not necessarily limited thereto, as long as the elements are used as metal anode active materials or metalloid anode active materials forming alloys or compounds with lithium. For example, nickel (Ni) does not form an alloy with lithium, and thus nickel (Ni) is not a metal anode active material.

The anode active material layer 22 includes either a kind of anode active material among the anode active materials as such, or a mixture of a plurality of anode active materials different from one another. For example, the anode active material layer 22 includes only amorphous carbon, or at least one of gold (Au), platinum (Pt), palladium (Pd), silicon (Si), silver (Ag), aluminum (Al), bismuth (Bi), Tin (Sn), or zinc (Zn). Alternatively, the anode active material layer 22 includes mixtures of amorphous carbon with at least one of gold (Au), platinum (Pt), palladium (Pd), silicon (Si), silver (Ag), aluminum (Al), bismuth (Bi), tin (Sn), or zinc (Zn). The mixing ratio of the mixture of amorphous carbon with gold and the like is, for example, about 10:1 to about 1:2, about 5:1 to about 1:1, or about 4:1 to about 2:1 by weight, but is not limited thereto, and is selected according to the desired characteristics of the all-solid secondary battery 1. The anode active material has such a composition as described above, thereby the cycle characteristics of the all-solid secondary battery 1 are further improved.

The anode active material included in the anode active material layer 22 includes, for example, a mixture of a first particle formed of amorphous carbon with a second particle formed of a metal or a metalloid. The metal or metalloid may be, for example, at least one of gold (Au), platinum (Pt), palladium (Pd), silicon (Si), silver (Ag), aluminum (Al), bismuth (Bi), tin (Sn), or Zinc (Zn). The metalloid may be a semiconductor. The amount of the second particle is about 8% to about 60% by weight, about 10% to about 50% by weight, about 15% to about 40% by weight, or about 20% to about 30% by weight based on the total weight of the mixture. Having the amount of the second particle in such range, for example, further improves the cycle characteristics of the all-solid secondary battery 1.

The binder included in the anode active material layer 22 is, for example, at least one of styrene-butadiene rubber (SBR), polytetrafluoroethylene (PTFE), polyvinylidene fluoride (PVDF), polyethylene, vinylidene fluoride/hexafluoropropylene copolymer, polyacrylonitrile (PAN), or polymethyl methacrylate (PMMA), but is not limited thereto, and may be any material suitable for use as a binder. The binder may be constituted as a singularity or a plurality of binders different from one another.

The anode active material layer 22 includes the binder, thereby the anode active material layer 22 is stabilized on top of the anode current collector 21. In addition, cracking of the anode active material layer 22 is suppressed despite the change in volume and/or change in relative position of the anode active material layer 22 during charging and discharging. For example, in case the anode active material layer 22 is not including the binder, the anode active material layer 22 may be relatively easily separated from the anode current collector 21. The anode active material layer 22 detaches from the anode current collector 21, thereby the anode current collector 21 is exposed, wherein the anode current collector 21 contacts the solid electrolyte layer 30 in the region where the anode current collector 21 is exposed, thereby the probability of a short circuit occurring increases. The anode active material layer 22 is, for example, located on top of the anode current collector 21, wherein the anode active material layer 22 is formed by applying a slurry having materials constituting the anode active material layer 22 dispersed therein on top of the anode current collector 21, and drying the slurry. Including the binder in the anode active material layer 22 provides stable dispersion of the anode active material in the slurry to be possible. For example, in case the slurry is applied on top of the anode current collector 21 by the screen printing method, suppressing the clogging of the screen (for example, the blockage due to the aggregation of the anode active material) is possible.

The anode active material layer 22 may further include an additive, for example, a filler, a coating agent, a dispersant, or an ion conductive assistant.

The thickness of the anode active material layer 22 is, for example, 50% or less, 40% or less, 30% or less, 20% or less, 10% or less, or 5% or less of the thickness of the cathode active material layers 12. The thickness of the anode active material layer 22 is, for example, 1 um to 20 um, 2 um to 10 um, or 3 um to 7 um. In case the thickness of the anode active material layer 22 is substantially thin, the anode active material layer 22 collapses by lithium dendrites formed between the anode active material layer 22 and the anode current collector 21, thereby improving the cycle characteristics of the all-solid secondary battery 1 becomes difficult. In case the thickness of the anode active material layer 22 is substantially increased, the energy density of the all-solid secondary battery 1 decreases, and the internal resistance of the all-solid secondary battery 1 caused by the anode active material layer 22 increases, thereby improving the cycle characteristics of the all-solid secondary battery 1 becomes difficult.

As the thickness of the anode active material layer 22 decreases, for example, the charging capacity of the anode active material layer 22 also decreases. The charging capacity of the anode active material layer 22 is, for example, 50% or less, 40% or less, 30% or less, 20% or less, 10% or less, 5% or less, or 2% or less compared to the charging capacity of the cathode active material layer 12. The charging capacity of the anode active material layer 22 is, for example, 0.1% to 50%, 0.1% to 40%, 0.1% to 30%, 0.1% to 20%, 0.1% to 10%, 0.1% to 5%, or 0.1% to 2% compared to the charging capacity of the cathode active material layer 12. As the charging capacity of the anode active material layer 22 is substantially small, the thickness of the anode active material layer 22 becomes substantially thin, and thereby during charging and discharging of which are repetitious, the anode active material layer 22 collapses by the lithium dendrites formed between the anode active material layer 22 and the anode current collector 21 thereby improving the cycle characteristics of the all-solid secondary battery 1 becomes difficult. As the charging capacity of the anode active material layer 22 is substantially increased, the energy density of the all-solid secondary battery 1 decreases, and the internal resistance of the all-solid secondary battery 1 caused by the anode active material layer 22 increases, thereby improving the cycle characteristics of the all-solid secondary battery 1 becomes difficult.

The charging capacity of the cathode active material layer 12 is obtained by multiplying the charging capacity density (milliampere hours per gram; mAh/g) of the cathode active material by the mass of the cathode active material included within the cathode active material layer 12. In case several kinds of cathode active materials are used, the charging capacity density x mass value is calculated for each cathode active material, and the sum of the values thereof is the charging capacity of the cathode active material layer 12. The charging capacity of the anode active material layer 22 is also calculated in the same manner. In other words, the charging capacity of the anode active material layer 22 is obtained by multiplying the charging capacity density (mAh/g) of the anode active material by the mass of the anode active material included within the anode active material layer 22. In case several kinds of anode active materials are used, the charging capacity density x mass value is calculated for each anode active material, and the sum of the values thereof is the charging capacity of the anode active material layer 22. Herein, the charging capacity density of the cathode active material and the anode active material is an estimated capacity measured using an all-solid half-cell having lithium metal as a counter electrode. The charging capacity of the cathode active material layer 12 and that of the anode active material layer 22 are directly measured by using the all-solid half-cell. Dividing the measured charging capacity by the mass of the cathode and anode active materials, respectively, the charging capacity density is obtained. Alternatively, the charging capacity of the cathode active material layer 12 and that of the anode active material layer 22 may be an initial charging capacity measured at the first cycle.

Referring to FIG. 6, the all-solid secondary battery 1a may further include, for example, a metal layer 23 located between the anode current collector 21 and the anode active material layer 22. The metal layer 23 includes lithium or a lithium alloy. Thus, the metal layer 23 acts as a lithium reservoir, for example. The lithium alloy is, for example, a Li—Al alloy, a Li—Sn alloy, a Li—In alloy, a Li—Ag alloy, a Li—Au alloy, a Li—Zn alloy, a Li—Ge alloy, a Li—Si alloy, or the like, but is not limited thereto, and may be any type of lithium alloy used in the art. The metal layer 23 may be made of one of the alloys as such or lithium, or may be made of various kinds of alloys.

Although the thickness of the metal layer 23 is not specifically limited, for example, the thickness is in the range as such as about 1 μm to about 1000 μm, about 1 μm to about 500 μm, about 1 μm to about 200 μm, about 1 μm to about 150 μm, about 1 μm to about 100 μm, or about 1 μm to about 50 μm. In case the thickness of the metal layer 23 is substantially thin, the metal layer 23 acting as the lithium reservoir becomes difficult. In case the thickness of the metal layer 23 is substantially thick, possibly the mass and volume of the all-solid secondary battery 1 may increase, and the cycle characteristics thereof may rather deteriorate. The metal layer 23 may be, for example, a metal foil having the thickness in such range as described above.

The metal layer 23 included within the all-solid secondary battery 1a, for example, is either located between the anode current collector 21 and the anode active material layer 22 of the all-solid secondary battery 1a before being assembled, or located by the charging of the all-solid secondary battery 1a between the anode current collectors 21 and the anode active material layer 22 of the all-solid secondary battery 1 after being assembled. In case the metal layer 23 is located between the anode current collector 21 and the anode active material layer 22 prior to the assembly of the all-solid secondary battery 1a, wherein the metal layer 23 is a metal layer having lithium, the metal layer 23 acts as the lithium reservoir. For example, before assembly of the all-solid secondary battery 1a, a lithium foil is located between the anode current collector 21 and the anode active material layer 22. As a result, the cycle characteristics of the all-solid secondary battery 1a including the metal layer 23 are further improved. In the case where the metal layer 23 is located by the charging of the all-solid secondary battery 1a after the assembling thereof, the metal layer 23 is not included in the assembling of the all-solid secondary battery 1a, thereby the energy density of the all-solid secondary battery 1a increases. For example, during charging the all-solid secondary battery 1a, the charging exceeds the charging capacity of the anode active material layer 22. In other words, the anode active material layer 22 is overcharged. In the initial stage of charging, the anode active material layer 22 has lithium occluded. The anode active material included in the anode active material layer 22 forms an alloy or a compound with lithium ions transferred from the cathode layer 10. In case the charging exceeds the charging capacity of the anode active material layer 22, for example, lithium is located in the rear surface of the anode active material layer 22, more specifically, between the anode current collector 21 and the anode active material layer 22, thereby the metal layer corresponding to the metal layer 23 is formed by the located lithium. The metal layer 23 is the metal layer mainly constituting of lithium (i.e., metal lithium). The result as such is obtained by, for example, the anode active material included in the anode active material layer 22 having a material forming an alloy or a compound with lithium. In case discharged, lithium of the anode active material layer 22 and lithium of the metal layer 23 are ionized and moves towards the cathode layer 10. Therefore, using lithium as the anode active material in the all-solid secondary battery 1a is possible. In addition, the anode active material layer 22 covers the metal layer 23, thereby the anode active material layer 22 acts as a protective layer of the metal layer 23, and also suppresses increasing deposition of lithium dendrites. Therefore, the short circuit and the charging capacity reduction of the all-solid secondary battery 1a are suppressed, and thereby, the cycling characteristics of the all-solid secondary battery 1a are improved. In addition, in case the metal layer 23 is located by the charging of the all-solid secondary battery 1a after assembling the all-solid secondary battery 1a, the anode current collector 21, the anode active material layer 22, and the region therebetween are, for example, Li-free region, wherein the region is not having lithium (Li) in the initial state or after the discharging of the all-solid secondary battery 1a.

The anode current collector 21, for example, is formed of a material not reacting with lithium, more specifically, not forming either an alloy or a compound. The material constituting the anode current collector 21 is, for example, copper (Cu), stainless steel, titanium (Ti), iron (Fe), cobalt (Co), and nickel (Ni), but is not limited thereto, and any suitable electrode current collector can be used. The anode current collector 21 may be formed of one of the above-described metals, or may be formed of an alloy of two or more metals or a covering material. The anode current collector 21 is, for example, in the form of a plate or foil.

The all-solid secondary battery 1 may, for example, further include a thin film having an element capable of forming an alloy with lithium on top of the anode current collector 21. The thin film is located between the anode current collector 21 and the anode active material layer 22. The thin film, for example, includes an element capable of forming an alloy with lithium. The element capable of forming an alloy with lithium is, for example, gold, silver, zinc, tin, indium, silicon, aluminum, bismuth, or the like, but is not necessarily limited thereto, and any element which may form an alloy with lithium in the art is possible. The thin film is constituted by one of the metals as such above, or an alloy of several kinds of metals. By having the thin film located on top of the anode current collector 21, for example, the deposition form of the metal layer 23 located between the thin film and the anode active material layer 22 is further flattened, and the cycle characteristics of the all-solid secondary battery 1 may be further improved.

The thickness of the thin film is, for example, about 1 nm to about 800 nm, about 10 nm to about 700 nm, about 50 nm to about 600 nm, or about 100 nm to about 500 nm. In case the thickness of the thin film is less than 1 nm, the thin film exhibiting the function therefor may be difficult. In case the thickness of the thin film is substantially thick, the thin film thereof occludes lithium, thereby the amount of lithium located in the anode decreases, thereby decreasing the energy density of the all-solid battery and deteriorating the cycle characteristics of the all-solid secondary battery 1. The thin film may be located on top of the anode current collectors 21 by, for example, vacuum deposition, sputtering, plating, or the like, but is not necessarily limited to thereto, and any thin film forming process in the technical field may be used.

A method for a preparation of the solid ion conductor compound according to another embodiment includes: providing a mixture by contacting a compound including lithium, a compound having al least one element of Group 2 or Group 11 of the periodic table, a compound having phosphorus (P), and a compound having a Group 17 element; and providing the solid ion conductor compound by heat treating the mixture in an inert atmosphere. The solid ion conductor compound is, for example, the solid ion conductor compound represented by Formula 1.

The compound having lithium includes sulfides having lithium. For example, lithium sulfide is represented.

The compound having at least one element of Group 2 or Group 11 of the Periodic Table includes a sulfide having at least one element of Groups 2 or Group 11 of the Periodic Table. For example, copper sulfide, silver sulfide, and sodium sulfide are mentioned.

The compound containing phosphorus (P) includes a sulfide compound including phosphorus. For example, $P_2S_5$ is represented. A compound having Sulfur (S) may be further added in the mixture.

The compound having Group 17 elements includes lithium salts having Group 17 elements. For example, LiCl, LiF, LiBr, LiI are represented.

The compounds as such may be prepared by contacting the starting materials in suitable amounts, for example stoichiometric amounts, to form a mixture and heat treating the mixture. The contacting, for example, may include milling such as ball milling, or grinding.

The mixture may further include a compound having Group 1 metal element other than Li. The compound having Group 1 metals other than Li include, for example, sulfides of Group 1 metals. For example, $Na_2S$, $K_2S$ are represented.

The mixture of precursors formed in a stoichiometric composition may be heat treated in an inert atmosphere to produce the solid ion conductor compound.

The heat treatment may be carried out, for example, at a temperature of from about 400° C. to about 700° C., about 400° C. to about 650° C., about 400° C. to about 600° C., about 400° C. to about 550° C., or about 400° C. to about 500° C. The heat treating time may be, for example, from about 1 to about 36 hours, about 2 to about 30 hours, about 4 to about 24 hours, about 10 to about 24 hours, or about 16 to about 24 hours. The inert atmosphere is an atmosphere having an inert gas. The inert gas is, for example, nitrogen, argon, and the like, but is not necessarily limited thereto, and any inert gas used as an inert gas in the art may be used.

The inventive concept is described in more detail with reference to the following examples and comparative examples. However, the examples are provided to illustrate the inventive concept of the present invention, and the scope of the present invention is not limited thereto.

EXAMPLES

Method of Preparing Solid Ion Conductor Compound

Example 1: A Method of Preparing $(Li_{5.72}Cu_{0.03})PS_{4.75}Cl_{1.25}$

In a glove box having an Ar atmosphere, the desired chemical composition of $(Li_{5.72}Cu_{0.03})PS_{4.75}Cl_{1.25}$ is obtained by combining $Li_2S$ as a lithium precursor, $P_2S_5$ as a phosphor precursor, LiCl as a chlorine precursor, and $Cu_2S$ as a copper precursor in a stoichiometric ratio, and grinding and mixing for 1 hour at 100 rpm in a planetary ball mill having a zirconia (YSZ) ball and having the Ar atmosphere, followed by grinding and mixing at 800 rpm for 30 minutes, thereby the mixture above was obtained. The obtained mixture was pressed with uniaxial pressure to prepare a pellet having a thickness of about 10 mm and a diameter of about 13 mm. The prepared pellet was covered with gold foil, placed in a carbon crucible, and the carbon crucible was vacuum sealed using a quartz glass tube. The vacuum-sealed pellet was heated at 1.0° C./min from room temperature to 500° C. using an electric furnace, and then heat-treated at 500° C. for 12 hours, and then cooled to room temperature at 1.0° C./min to prepare the solid ion conductor compound. The composition of the prepared solid ion conductor compound was $(Li_{5.72}Cu_{0.03})PS_{4.75}Cl_{1.25}$ (substituted cation ratio: 0.005).

Example 2: Preparation of $(Li_{5.69}Cu_{0.06})PS_{4.75}Cl_{1.25}$

The solid ion conductor compound was prepared in the same manner as in Example 1, except that the stoichiometric mixing ratio of the starting material was changed to obtain the desired composition of $(Li_{5.69}Cu_{0.06})PS_{4.75}Cl_{1.25}$.

The composition of the prepared solid ion conductor compound was $(Li_{5.69}Cu_{0.06})PS_{4.75}Cl_{1.25}$ (substituted cation ratio: 0.01).

Example 3: Preparation of $(Li_{5.69}Cu_{0.12})PS_{4.75}Cl_{1.25}$

The solid ion conductor compound was prepared in the same manner as in Example 1, except that the stoichiometric mixing ratio of the starting material was changed to obtain the desired composition of $(Li_{5.63}Cu_{0.12})PS_{4.75}Cl_{1.25}$.

The composition of the prepared solid ion conductor compound was $(Li_{5.63}Cu_{0.12})PS_{4.75}Cl_{1.25}$ (substituted cation ratio: 0.02).

Example 4: Preparation of $(Li_{5.57}Cu_{0.18})PS_{4.75}Cl_{1.25}$

The solid ion conductor compound was prepared in the same manner as in Example 1, except that the stoichiometric mixing ratio of the starting material was changed to obtain the desired composition of $(Li_{5.57}Cu_{0.18})PS_{4.75}Cl_{1.25}$.

The composition of the prepared solid ion conductor compound was $(Li_{5.57}Cu_{0.18})PS_{4.75}Cl_{1.25}$ (substituted cation ratio: 0.03).

Example 5: Preparation of $(Li_{5.45}Cu_{0.3})PS_{4.75}Cl_{1.25}$

The solid ion conductor compound was prepared in the same manner as in Example 1, except that the stoichiometric mixing ratio of the starting material was changed to obtain the desired composition of $(Li_{5.45}Cu_{0.3})PS_{4.75}Cl_{1.25}$.

The composition of the prepared solid ion conductor compound was $(Li_{5.45}Cu_{0.3})PS_{4.75}Cl_{1.25}$ (substituted cation ratio: 0.05).

Example 6: Preparation of $(Li_{5.15}Cu_{0.6})PS_{4.75}Cl_{1.25}$

The solid ion conductor compound was prepared in the same manner as in Example 1, except that the stoichiometric mixing ratio of the starting material was changed to obtain the desired composition of $(Li_{5.15}Cu_{0.6})PS_{4.75}Cl_{1.25}$.
The composition of the prepared solid ion conductor compound was $(Li_{5.15}Cu_{0.6})PS_{4.75}Cl_{1.25}$ (substituted cation ratio: 0.10).

Example 7: Preparation of $(Li_{5.72}Ag_{0.03})PS_{4.75}Cl_{1.25}$

The solid ion conductor compound was prepared in the same manner as in Example 1, except that the stoichiometric mixing ratio of the starting materials was changed by using $Ag_2S$, which is Ag precursor, instead of Cu precursor to obtain the desired composition of $(Li_{5.72}Ag_{0.03})PS_{4.75}Cl_{1.25}$. The composition of the prepared solid ion conductor compound was $(Li_{5.72}Ag_{0.03})PS_{4.75}Cl_{1.25}$ (substituted cation ratio: 0.005).

Example 8: Preparation of $(Li_{5.72}Cu_{0.02}Na_{0.01})PS_{4.75}Cl_{1.25}$

The solid ion conductor compound was prepared in the same manner as in Example 1, except that the stoichiometric mixing ratio of the starting materials was changed by using $Cu_2S$, which is a Cu precursor, and $Na_2S$, which is a Na precursor, to obtain the desired composition of $(Li_{5.72}Cu_{0.02}Na_{0.01})PS_{4.75}Cl_{1.25}$. The composition of the prepared solid ion conductor compound was $(Li_{5.72}Cu_{0.02}Na_{0.01})PS_{4.75}Cl_{1.25}$ (substituted cation ratio: 0.005).

Example 9: Preparation of $(Li_{5.74}Cu_{0.01})PS_{4.75}Cl_{1.25}$

A solid ion conductor compound was prepared in the same manner as in Example 1, except that the stoichiometric mixing ratio of the starting material was changed to obtain the desired composition of $(Li_{5.74}Cu_{0.01})PS_{4.75}Cl_{1.25}$. The composition of the prepared solid ion conductor compound was $(Li_{5.74}Cu_{0.01})PS_{4.75}Cl_{1.25}$ (substituted cation ratio: 0.0017).

Example 10: Preparation of $(Li_{5.70}Cu_{0.05})PS_{4.75}Cl_{1.25}$

A solid ion conductor compound was prepared in the same manner as in Example 1, except that the stoichiometric mixing ratio of the starting material was changed to obtain the desired composition of $(Li_{5.70}Cu_{0.05})PS_{4.75}Cl_{1.25}$. The composition of the prepared solid ion conductor compound was $(Li_{5.70}Cu_{0.01})PS_{4.75}Cl_{1.25}$ (substituted cation ratio: 0.0087).

Example 11: Preparation of $(Li_{5.72}Cu_{0.03})PS_{4.75}Cl_{1.15}Br_{0.1}$

A solid ion conductor compound was prepared in the same manner as in Example 1, except that the stoichiometric mixing ratio of the starting material was changed to obtain the desired composition of $(Li_{5.72}Cu_{0.03})PS_{4.75}Cl_{1.15}Br_{0.1}$. The composition of the prepared solid ion conductor compound was $(Li_{5.72}Cu_{0.03})PS_{4.75}Cl_{1.15}Br_{0.1}$ (substituted cation ratio: 0.005). LiBr was additionally used as a bromine precursor.

Example 12: Preparation of $(Li_{5.72}Cu_{0.03})P(S_{4.725}(SO_4)_{0.025})Cl_{1.25}$ A solid ion conductor compound was prepared in the same manner as in Example 1, except that the stoichiometric mixing ratio of the starting material was changed to obtain the desired composition of $(Li_{5.72}Cu_{0.03})P(S_{4.725}(SO_4)_{0.025})Cl_{1.25}$. The composition of the prepared solid ion conductor compound was $(Li_{5.72}Cu_{0.03})P(S_{4.725}(SO_4)_{0.025})Cl_{1.25}$ (substituted cation (Cu) ratio: 0.005, substituted anion ($SO_4$) ratio: 0.005). $Li_2SO_4$ was additionally used as a $SO_4$ precursor.

Comparative Example 1: Preparation of $Li_{5.75}PS_{4.75}Cl_{1.25}$

The solid ion conductor compound was manufactured in the same manner as in Example 1, except that the stoichiometric mixing ratio of the starting material was changed without adding Cu precursor to obtain the desired composition of $Li_{5.75}PS_{4.75}Cl_{1.25}$. The composition of the prepared solid ion conductor compound is $Li_{5.75}PS_{4.75}Cl_{1.25}$.

Example 13: Preparation of All-Solid Secondary Battery (Cathode Layer Preparation)
$LiNi_{0.8}Co_{0.15}Al_{0.05}O_2$ (NCA) is prepared as the cathode active material. The sulfide-based solid electrolyte powder prepared in Example 1 is prepared as the solid electrolyte. Carbon nanofibers (CNF) are prepared as conductive agents. The materials as such are mixed in a weight ratio of cathode active material:solid electrolyte:conductive agent=60:35:5 to prepare a cathode mixture.
(Preparation of Solid Electrolyte Powder)
The sulfide-based solid ion conductor compound prepared in Example 1 is ground using an agate mortar and used as the solid electrolyte powder.
(Anode Layer Preparation)
A metal lithium foil having a thickness of 30 um is prepared as the anode.
(Preparation of All-Solid Secondary Battery)
After stacking the lithium metal foil having a thickness of 30 μm, 150 mg of the solid electrolyte powder, and 15 mg of the cathode mixture in respective order on top of a SUS lower electrode, a SUS upper electrode is placed on top of the cathode mixture to prepare a laminate, and then the prepared laminate is pressed for 2 minutes at a pressure of 4 ton/cm². Subsequently, the pressed laminate is pressurized with a torque of 4 N·m using a torque wrench to prepare the all-solid secondary battery.
In the prepared all-solid secondary battery, the solid electrolyte is not decomposed by the lithium metal anode and is stable.

Examples 14 to 24

The all-solid secondary battery is prepared in the same manner as in Example 13, except that each of the solid electrolyte powders prepared in Examples 2 to 12 are used instead of the solid electrolyte powders prepared in Example 1.

Comparative Example 2

The all-solid secondary battery is prepared in the same manner as in Example 13, except that the solid electrolyte powder prepared in Comparative Example 1 is used instead of the solid electrolyte powder prepared in Example 1.

Evaluation Example 1: X-ray Diffraction Experiment

After preparing the powder of the solid ion conductor compounds prepared in Examples 1 to 5 by grinding thereof using the agate mortar, the powder XRD spectra are measured and a part of the results thereof are illustrated in FIG. 1. Cu Kα radiation is used for measuring the XRD spectrum. The solid ion conductor compounds of Examples 1 to 5 are belonging to the F-43m space group, are having structures of the cubic crystal system, and are the argyrodite-type sulfides having the argyrodite-type crystal structure.

The solid ion conductor compound of Example 2 has the peak intensity ratio Ia/Ib of 0.79 in the XRD spectrum using CuKα line, wherein the peak intensity (Ia) is at diffraction angle of 2θ=46.0°±1.0°, and the peak intensity (Ib) with respect to the peak intensity (Ia) is at diffraction angle of 2θ=53.0°±1.0°.

The solid ion conductor compound of Example 3 has the peak intensity ratio Ia/Ib of 0.90 in the XRD spectrum using CuKα line, wherein the peak intensity (Ia) is at diffraction angle of 2θ=46.0°±1.0°, and the peak intensity (Ib) with respect to the peak intensity (Ia) is at diffraction angle of 2θ=53.0°±1.0°.

The solid ion conductor compound of Example 2 has the full width at half maximum (FWHM) of the peak at a diffraction angle of 2θ=46.0°±1.0° in the XRD spectrum using CuKα line of about 0.2°.

The solid ion conductor compound of Example 3 has the full width at half maximum (FWHM) of the peak at a diffraction angle of 2θ=46.0°±1.0° in the XRD spectrum using CuKα line of about 0.2°.

Evaluation Example 2: Measurement of Ion Conductivity

After preparing the powder of the solid ion conductor compound prepared in Examples 1 to 12 and Comparative Example 1 by grinding thereof using the agate mortar, 200 mg of each powder was pressed at a pressure of 4 ton/cm² for about 2 minutes to obtain pellet specimens having thickness of about 100 μm and diameter of about 13 mm. A symmetry cell was prepared by placing an indium (In) electrode having thickness of 50 μm and diameter of 13 mm on both sides of the prepared pellet specimen. The preparation of the symmetric cell was performed in the glove box having the Ar atmosphere.

The impedance of the pellets was measured by a 2-probe method using an impedance tester (Material Mates 7260 impedance analyzer) on the pellet specimen having the indium electrodes placed on both sides thereof. The frequency range was from 0.1 Hz to 1 MHz, and the amplitude voltage was 10 mV. The measurements above were measured at 25° C. in Ar atmosphere. The resistance value was calculated from the arc of the Nyguist plot relative to the impedance measurement, and the ion conductivity was calculated considering the area and thickness of the specimen.

The measurement results are illustrated in the following Table 1 and FIG. 2.

TABLE 1

|  | Ion Conductivity at Room Temperature (25° C.) [mS/cm] |
| --- | --- |
| Example 1 | 3.8 |
| Example 2 | 3.4 |
| Example 3 | 3.7 |
| Example 4 | 3.2 |
| Example 5 | 2.7 |
| Example 6 | 1.8 |
| Example 7 | 3.28 |
| Example 8 | 4.03 |
| Example 9 | 3.48 |
| Example 10 | 3.73 |
| Example 11 | 4.3 |
| Example 12 | 2.8 |
| Comparative Example 1 | 2.2 |

Figure 2:
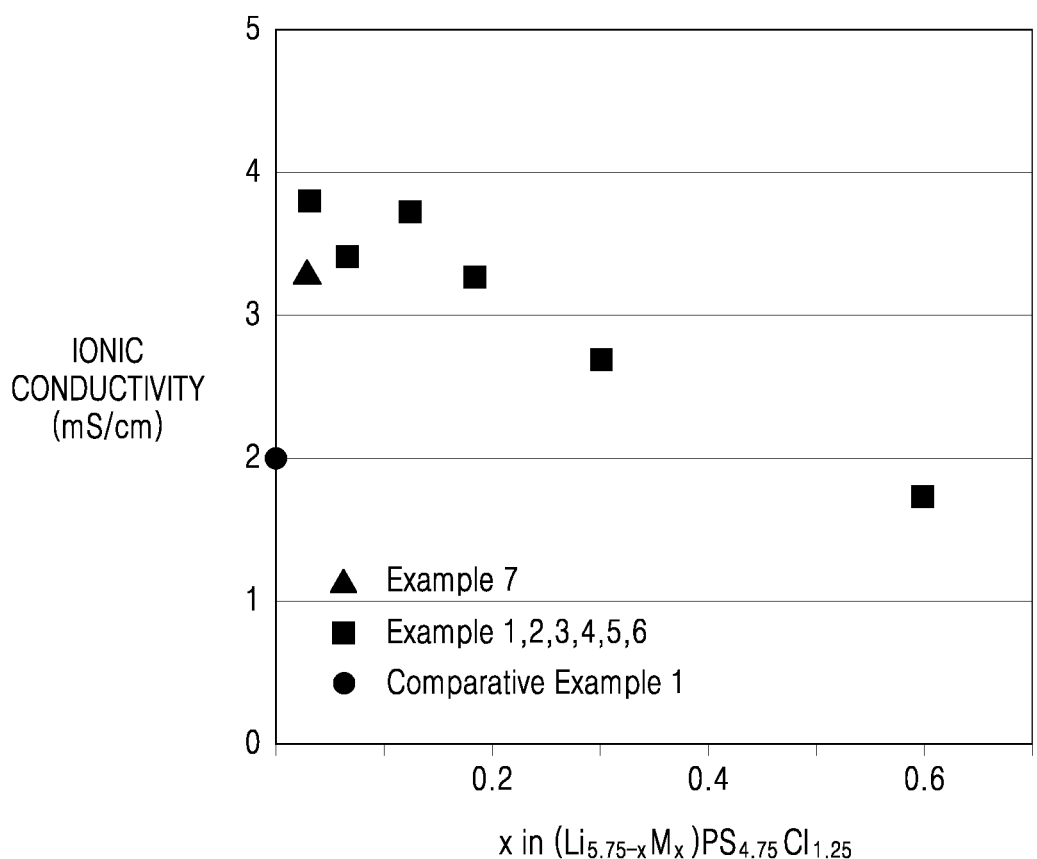
FIG. 2 is a graph of ionic conductivity (millisiemens per centimeter, mS/cm) versus x in $(Li_{5.75-x}M_x)PS_{4.75}Cl_{1.25}$ for solid ion conductor compounds prepared in Examples 1 to 7 and Comparative Example 1.

As illustrated in Table 1 and FIG. 2, the solid ion conductor compound of Examples 1 to 12 exhibits high ion conductivity of at least 1.8 mS/cm at room temperature.

The solid ion conductor compounds of Examples 1 to 5 and Examples 7 to 12 exhibit more improved ion conductivity than the solid ion conductor compound of Comparative Example 1.

Evaluation Example 3: Evaluation of Atmospheric Stability

After preparing the powder of the solid ion conductor compound prepared in Examples 3 and Comparative Example 1 by grinding thereof using the agate mortar, the prepared powder was stored in an air atmosphere having a dew point of less than −60° C. for 10 days in a dry room, and then taken out to measure the change in the ion conductivity. The change in the ion conductivity was calculated using the ion conductivity retention rate of Mathematical Equation 1 below. The measurement results were shown in Table 2 below. The initial ion conductivity was the ion conductivity of the prepared powder prior to storage in the dry room. The measurement of the ion conductivity was performed under the same conditions using the same method as in Evaluation Example 2.

Ionic Conductivity Retention Rate=[Ion Conductivity of Solid Ion Conductor Compound after 10 Days Elapsed/Ion Conductivity of Initial Solid Ion Conductor Compounds]×100%   Mathematical Equation 1

TABLE 2

|  | Ion Conductivity Retention [%] |
| --- | --- |
| Example 3 | 77.4 |
| Comparative Example 1 | 65.6 |

As illustrated in Table 1, the solid ion conductor compound of Example 3 had more improved ion conductivity retention rate than the solid ion conductor compound of Comparative Example 1.

The solid ion conductor compound of Example 3 had more improved atmospheric stability than the solid ion conductor compound of Comparative Example 1.

Evaluation Example 4: Charging/Discharging Test, Interfacial Stability Evaluation The charging and discharging characteristics of the all-solid secondary battery prepared in Example 13 and Comparative Example 2 was evaluated by the following charging and discharging test. The charging and discharging test were performed by placing the all-solid secondary battery in a chamber at 45° C.

In the first cycle, the battery was charged using 0.1 C constant current until the battery voltage reached 4.25V and then charged at a constant voltage of 4.25V until the current reached 0.05 C. Subsequently, the discharging was performed with the constant current of 0.1 C until the battery voltage reached 2.5V. The discharging capacity of the first cycle was the standard capacity.

In the second cycle, the battery was charged using the 0.1 C constant current until the battery voltage reached 4.25V and then charged at the constant voltage of 4.25V for 40 hours. Subsequently, the discharging was performed with the constant current of 0.1 C until the battery voltage reached 2.5V. The discharging capacity of the second cycle was the retention capacity.

In the third cycle, the battery was charged using the 0.1 C constant current until the battery voltage reached 4.25V and then charged at the constant voltage of 4.25V for 40 hours. Subsequently, the discharging was performed with the constant current of 0.1 C until the battery voltage reached 2.5 V. The discharging capacity of the third cycle is the recovery capacity.

Each cycle had a resting period for 10 minutes after the charging and discharging.

The capacity recovery rate after storage in high temperature and capacity retention rate after storage in high temperature of the all-solid secondary battery prepared in Example 13 and Comparative Example 2 were shown in Table 3 below.

Capacity retention after storage in high temperature and recovery capacity after storage in high temperature were calculated from the following Equations 2 and 3.

Capacity Retention After Storage in High Temperature (%)=[Capacity Maintained After Storage in High Temperature/Standard Capacity]×100%  Equation 2

Recovery Capacity After Storage in High Temperature (%)=[Capacity Recovered After Storage in High Temperature/Standard Capacity]×100%  Equation 3

TABLE 3

| | Retention Capacity Percentage [%] | Recovery Capacity Percentage [%] |
|---|---|---|
| Example 13 | 100 | 97.7 |
| Comparative Example 2 | 98.8 | 96.4 |

As illustrated in Table 3, the all-solid secondary battery of Example 13 has the more improved capacity retention rate and capacity recovery rate after being stored in high temperature for substantially long time in charged state than the all-solid secondary battery of Comparative Example 2.

The all-solid secondary battery of Example 13 has more improved stability (i.e., oxidation resistance) to lithium metal than the all-solid secondary battery of Comparative Example 2.

Evaluation Example 5: Charging/Discharging Test, Evaluation of Lifespan Characteristics The lifespan characteristics of the all-solid secondary battery of Example 13 and Comparative Example 2 were evaluated, wherein the evaluation of oxidation stability represented by Evaluation Example 4 was completed. The charging and discharging test were performed by placing the all-solid secondary battery in the chamber at 45° C.

The battery was charged with the constant current of 0.1 C until the battery voltage was 4.25V, and was charged at the constant voltage of 4.25V until the current was 0.05 C. Subsequently, the discharging was performed with the constant current of 0.1 C until the battery voltage reached 2.5V. Charging and discharging cycles as such were performed 10 times. Each cycle has a resting period for 10 minutes after the charging and discharging. The capacity retention rate of the all-solid secondary battery prepared in Example 13 and Comparative Example 2 was shown in Table 4 and FIG. 3. The capacity retention rate was calculated by the following Equation 4.

Capacity retention (%)=[discharged capacity of 10th cycle/discharged capacity of 1st cycle]×100%  Equation 4

TABLE 4

| | Capacity Retention [%] |
|---|---|
| Example 13 | 97.7 |
| Comparative Example 2 | 95 |

Figure 3:
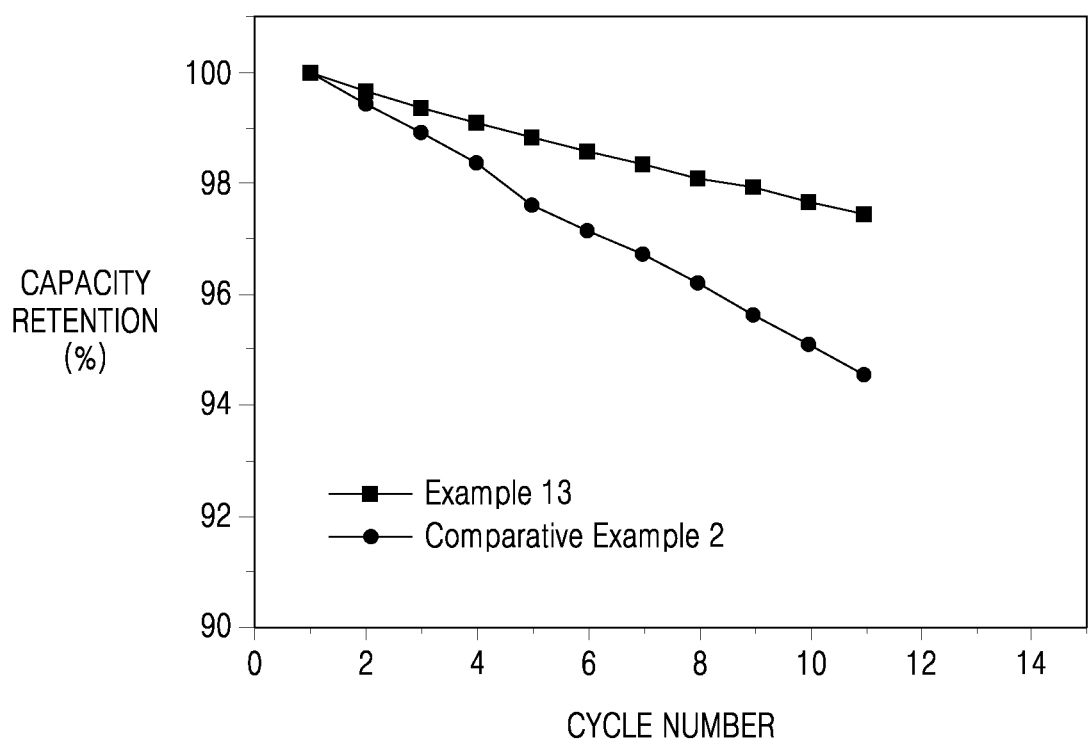
FIG. 3 is a graph of capacity retention (%) versus cycle number showing the lifespan characteristics of all-solid secondary batteries prepared in Example 13 and Comparative Example 2.

As illustrated in Table 4 and FIG. 3, the all-solid secondary battery of Example 13 has more improved lifespan characteristics in high temperature by having more improved oxidation resistance and interfacial stability than the all-solid secondary battery of Comparative Example 2.

According to one aspect, the electrochemical cell having improved stability and cycle characteristics is provided by including the solid ion conductor compound having improved lithium ion conductivity and stability to lithium metal.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An electrochemical cell comprising:
a cathode layer including a cathode active material layer;
an anode layer including an anode active material layer; and
an electrolyte layer arranged between the cathode layer and the anode layer, wherein at least one of the cathode active material layer and the electrolyte layer comprises a compound represented by Formula 2 and having an argyrodite-type crystal structure:

$$Li_{7-x-z}M1_xPS_{6-z}M3_z \quad \text{Formula 2}$$

wherein, in Formula 2,
M1 is at least one element of Group 2 or Group 11 of the periodic table,
M3 is at least one element of Group 17 of the periodic table, and
wherein $0<x<0.1$, and $1<z\leq2$, and
wherein M1 is a monovalent cation or a divalent cation.

2. The electrochemical cell of claim 1, wherein, in a compound of Formula 2, M1 is at least one of Cu, Ag, or Mg, or wherein M3 is at least one of F, Cl, Br, or I.

3. The electrochemical cell of claim 1, wherein the compound is represented by Formula 2a:

$$Li_{7-x-z}M1_xPS_{6-z}Cl_z \qquad \text{Formula 2a}$$

wherein

M1 is at least one of Cu, Ag, or Mg, and wherein $0<x<0.05$.

4. The electrochemical cell of claim 1, wherein the compound is represented by Formula 2b:

$$Li_{5.75-x}M1_xPS_{4.75}Cl_{1.25} \qquad \text{Formula 2b}$$

wherein M1 is at least one of Cu, Ag, or Mg, and wherein $0<x<0.05$.

5. A compound represented by Formula 3:

$$(Li_{1-b}M1_b)_{7-z}PS_{6-z}M3_z \qquad \text{Formula 3}$$

wherein, M1 is at least one element of Group 2 or Group 11 of the periodic table, and M1 is a monovalent cation or a divalent cation, M3 is at least one element of Group 17 of the periodic table, and M3 is a monovalent anion, and wherein $0<b\le0.01$ and $0\le z\le2$.

6. The compound of claim 5, wherein the compound is represented by Formula 3a, Formula 3b, or Formula 3c:

$$(Li_{1-b}Cu_b)_{7-z}PS_{6-z}M3_z \qquad \text{Formula 3a}$$

$$(Li_{1-b}Ag_b)_{7-z}PS_{6-z}M3_z \qquad \text{Formula 3b}$$

$$(Li_{1-b}Mg_b)_{7-z}PS_{6-z}M3_z, \qquad \text{Formula 3c}$$

Wherein M3 is at least one of F, Cl, Br, or I.

7. The compound of claim 5, wherein the compound is represented by $(Li_{1-b}Cu_b)_{7-z}PS_{6-z}Cl_z$, $(Li_{1-b}Ag_b)_{7-z}PS_{6-z}Cl_z$, $(Li_{1-b}Mg_b)_{7-z}PS_{6-z}Cl_z$, $(Li_{1-b}Cu_b)_{7-z}PS_{6-z}Br_z$, $(Li_{1-b}Ag_b)_{7-z}PS_{6-z}Br_z$, $(Li_{1-b}Mg_b)_{7-z}PS_{6-z}Br_z$, $(Li_{1-b}Cu_b)_{7-z}PS_{6-z}I_z$, $(Li_{1-b}Ag_b)_{7-z}PS_{6-z}I_z$, or $(Li_{1-b}Mgb)_{7-z}PS_{6-z}I_z$.

8. A compound represented by Formula 4:

$$Li_{7-x-w-z}M1_xM2_wPS_{6-z}M3_z \qquad \text{Formula 4}$$

wherein

M1 is at least one element of Group 2 or Group 11 of the periodic table, and M1 is a monovalent cation or a divalent cation, M2 is at least one metal element of Group 1 of the periodic table other than Li, and M1 is a monovalent cation, M3 is at least one element of Group 17 of the periodic table, and M3 is a monovalent anion, and wherein $0<x<0.1$, $0\le w<0.1$, $0<x+w<0.1$, and $0\le z\le2$.

9. The compound of claim 8, wherein the compound is represented by Formula 4a:

$$Li_{7-x-w-z}M1_xM2_wPS_{6-z}Cl_z \qquad \text{Formula 4a}$$

wherein

M1 is at least one of Cu, Ag, or Mg,

M2 is at least one of Na or K.

10. The compound of claim 8, wherein the compound is represented by Formula 4b:

$$Li_{5.75-x-w}M1_xM2_wPS_{4.75}Cl_{1.25} \qquad \text{Formula 4b}$$

wherein M1 is at least one of Cu, Ag, or Mg,

M2 is at least one of Na or K, and wherein $0<x<0.05$, $0<w<0.05$, and $0<x+w<0.05$.

11. A compound is represented by Formula 5:

$$(Li_{1-b-c}M1_bM2_c)_{7-z}PS_{6-z}M3_z \qquad \text{Formula 5}$$

wherein

M1 is at least one element of Group 2 or Group 11 of the periodic table, and M1 is a monovalent cation or a divalent cation, M2 is at least one metal element of Group 1 of the periodic table and is other than Li, and M2 is a monovalent cation, M3 is at least one element of Group 17 of the periodic table, and M3 is a monovalent anion, and wherein $0<b<0.02$, $0<c<0.02$, $0<b+c<0.02$, and $0\le z\le2$.

12. The compound of claim 11, wherein the compound is represented by Formula 5a, Formula 5b, Formula 5c, Formula 5d, Formula 5e, or Formula 5f:

$$(Li_{1-b-c}Cu_bNa_c)_{7-z}PS_{6-z}M3_z \qquad \text{Formula 5a}$$

$$(Li_{1-b-c}Ag_bNa_c)_{7-z}PS_{6-z}M3_z \qquad \text{Formula 5b}$$

$$(Li_{1-b-c}Mg_bNa_c)_{7-z}PS_{6-z}M3_z \qquad \text{Formula 5c}$$

$$(Li_{1-b-c}Cu_bK_c)_{7-z}PS_{6-z}M3_z \qquad \text{Formula 5d}$$

$$(Li_{1-b-c}Ag_bK_c)_{7-z}PS_{6-z}M3_z \qquad \text{Formula 5e}$$

$$(Li_{1-b-c}Mg_bK_c)_{7-z}PS_{6-z}M3_z \qquad \text{Formula 5e}$$

wherein, M3 is at least one of F⁻, Cl⁻, Br⁻, or I.

13. The compound of claim 11, wherein the compound represented by Formula 1 is represented by:

$(Li_{1-b-c}Cu_bNa_c)_{7-z}PS_{6-z}Cl_z$, $(Li_{1-b-c}Ag_bNa_c)_{7-z}PS_{6-z}Cl_z$, $(Li_{1-b-c}Mg_bNa_c)_{7-z}PS_{6-z}Cl_z$, $(Li_{1-b-c}Cu_bK_c)_{7-z}PS_{6-z}Cl_z$, $(Li_{1-b-c}Ag_bK_c)_{7-z}PS_{6-z}Cl_z$, $(Li_{1-b-c}Mg_bK_c)_{7-z}PS_{6-z}Cl_z$, $(Li_{1-b-c}Cu_bNa_c)_{7-z}PS_{6-z}Br_z$, $(Li_{1-b-c}Ag_bNa_c)_{7-z}PS_{6-z}Br_z$, $(Li_{1-b-c}Mg_bNa_c)_{7-z}PS_{6-z}Br_z$, $(Li_{1-b-c}Cu_bK_c)_{7-z}PS_{6-z}Br_z$, $(Li_{1-b-c}Ag_bK_c)_{7-z}PS_{6-z}Br_z$, $(Li_{1-b-c}Mg_bK_c)_{7-z}PS_{6-z}Br_z$, $(Li_{1-b-c}Cu_bNa_c)_{7-z}PS_{6-z}I_z$, $(Li_{1-b-c}Ag_bNa_c)_{7-z}PS_{6-z}I_z$, $(Li_{1-b-c}Mg_bNa_c)_{7-z}PS_{6-z}I_z$, $(Li_{1-b-c}Cu_bK_c)_{7-z}PS_{6-z}I_z$, $(Li_{1-b-c}Ag_bK_c)_{7-z}PS_{6-z}I_z$, or $(Li_{1-b-c}Mg_bK_c)_{7-z}PS_{6-z}I_z$, wherein $0<b<0.01$, $0<c<0.01$, $0<b+c\le0.01$, and $0<z\le2$.

14. The electrochemical cell of claim 1, wherein the compound represented by Formula 1 has an ion conductivity of 0.5 millisiemens per centimeter or greater at 25° C.

15. The electrochemical cell of claim 1, wherein the compound represented by Formula 1 has an ion conductivity retention of 70% or more, after 10 days in an air atmosphere having a dew point of less than −60° C., wherein the ion conductivity retention is expressed by Equation 1:

Ionic Conductivity Retention=[Ion Conductivity after 10 Days/Initial Ion Conductivity]×100%. Equation 1

16. The electrochemical cell of claim 1, wherein the compound represented by Formula 1 belongs to a cubic crystal system, or wherein the compound represented by Formula 1 belongs to an F-43m space group.

17. The electrochemical cell of claim 1, wherein a peak intensity ratio Ia/Ib, which is ratio of a peak intensity at a diffraction angle of 46.0°2θ±1.0° with respect to a peak intensity at a diffraction angle of 53.0°2θ±1.0°, when the compound is analyzed by X-ray diffraction using CuKα radiation, is no more than 1, or wherein a full width at half maximum of a peak at a diffraction angle of 46.0°2θ±1.0°2θ, when the compound is analyzed by X-ray diffraction using CuKα radiation, is no more than 0.3°2θ.

* * * * *